United States Patent
Pcolka et al.

(10) Patent No.: US 12,403,908 B2
(45) Date of Patent: Sep. 2, 2025

(54) NON-SELFISH TRAFFIC LIGHTS PASSING ADVISORY SYSTEMS

(71) Applicant: Garrett Transportation I Inc., Torrance, CA (US)

(72) Inventors: Matej Pcolka, Prague (CZ); David Vosahlik, Prague (CZ)

(73) Assignee: GARRETT TRANSPORTATION I INC., Torrance, CA (US)

( * ) Notice: Subject to any disclaimer, the term of this patent is extended or adjusted under 35 U.S.C. 154(b) by 444 days.

(21) Appl. No.: 17/694,400

(22) Filed: Mar. 14, 2022

(65) Prior Publication Data

US 2023/0286508 A1    Sep. 14, 2023

(51) Int. Cl.
*B60W 30/18* (2012.01)
*G06V 20/58* (2022.01)

(52) U.S. Cl.
CPC ..... *B60W 30/18159* (2020.02); *B60W 30/18154* (2013.01); *G06V 20/58* (2022.01); *B60W 2520/10* (2013.01); *B60W 2530/00* (2013.01); *B60W 2554/4041* (2020.02); *B60W 2554/4044* (2020.02); *B60W 2555/60* (2020.02); *B60W 2556/65* (2020.02); *B60W 2720/10* (2013.01)

(58) Field of Classification Search
CPC ..... B60W 30/18159; B60W 30/18154; B60W 2554/4041; B60W 2554/4044; B60W 2555/60; B60W 2556/65; B60W 2520/10; B60W 2530/00; B60W 2720/10; G06V 20/58
USPC .......................................................... 701/96
See application file for complete search history.

(56) References Cited

U.S. PATENT DOCUMENTS

| | | | |
|---|---|---|---|
| 8,478,500 B1 * | 7/2013 | Vahidi | G08G 1/096716 701/93 |
| 8,788,134 B1 | 7/2014 | Litkouhi et al. | |
| 8,948,995 B2 | 2/2015 | Pandita et al. | |
| 8,972,145 B2 | 3/2015 | Mahler et al. | |
| 9,511,769 B2 | 12/2016 | Fairgrieve et al. | |
| 9,697,729 B2 | 7/2017 | Vahidi et al. | |

(Continued)

FOREIGN PATENT DOCUMENTS

| | | |
|---|---|---|
| EP | 2945140 A1 | 11/2015 |
| EP | 3579211 A1 | 12/2019 |

(Continued)

OTHER PUBLICATIONS

Eliot, "The Truth is that Traffic Lights Won't be Shelved Due to Self-Driving Cars," Forbes.com, 8 pages, Mar. 20, 2021, Accessed Aug. 11, 2021.

(Continued)

*Primary Examiner* — Fadey S. Jabr
*Assistant Examiner* — Ahmed Alkirsh
(74) *Attorney, Agent, or Firm* — Seager, Tufte & Wickhem, LLP

(57) ABSTRACT

Methods, vehicles and systems for managing vehicle velocity along routes having traffic lights. The behavior of an individual vehicle is adjusted to account for surrounding vehicles to avoid inefficient outcomes across a group of vehicles. A vehicle is configured to determine the presence of other vehicles in a defined following distance, and uses the presence of such other vehicles to adjust its own travel strategy, with or without communication or coordination with, or control over, the other vehicles.

14 Claims, 13 Drawing Sheets

(56) References Cited

U.S. PATENT DOCUMENTS

| | | | |
|---|---|---|---|
| 10,239,529 B2 | 3/2019 | Filev et al. | |
| 10,388,168 B2 | 8/2019 | Deragarden | |
| 10,493,988 B2 | 12/2019 | Liu et al. | |
| 10,497,261 B2 | 12/2019 | Kim et al. | |
| 10,737,695 B2 | 8/2020 | Liu et al. | |
| 10,814,881 B2* | 10/2020 | Liu | G06N 3/044 |
| 10,843,690 B2 | 11/2020 | Shalev-Shwartz et al. | |
| 2006/0167784 A1 | 7/2006 | Hoffberg | |
| 2007/0087756 A1 | 4/2007 | Hoffberg | |
| 2008/0215512 A1 | 9/2008 | Narzisi et al. | |
| 2010/0036578 A1 | 2/2010 | Taguchi et al. | |
| 2010/0235285 A1 | 9/2010 | Hoffberg | |
| 2013/0176146 A1 | 7/2013 | Dusparic et al. | |
| 2014/0309814 A1 | 10/2014 | Ricci et al. | |
| 2014/0309815 A1 | 10/2014 | Ricci et al. | |
| 2014/0309839 A1 | 10/2014 | Ricci et al. | |
| 2014/0309864 A1 | 10/2014 | Ricci | |
| 2014/0309913 A1 | 10/2014 | Ricci et al. | |
| 2014/0309929 A1 | 10/2014 | Ricci | |
| 2014/0309934 A1 | 10/2014 | Ricci | |
| 2015/0006035 A1 | 1/2015 | Ricci | |
| 2015/0111591 A1 | 4/2015 | Hoffberg | |
| 2015/0112571 A1* | 4/2015 | Schmudderich | B60W 30/14 701/1 |
| 2016/0129908 A1 | 5/2016 | Harda | |
| 2016/0155326 A1 | 6/2016 | Ricci et al. | |
| 2016/0224951 A1 | 8/2016 | Hoffberg | |
| 2017/0067747 A1 | 3/2017 | Ricci | |
| 2017/0355368 A1 | 12/2017 | O'Dea et al. | |
| 2018/0001764 A1 | 1/2018 | Bang | |
| 2018/0068358 A1 | 3/2018 | Hoffberg | |
| 2018/0174449 A1* | 6/2018 | Nguyen | G08G 1/012 |
| 2019/0079540 A1 | 3/2019 | Yoon et al. | |
| 2019/0096238 A1 | 3/2019 | Chen et al. | |
| 2019/0244521 A1 | 8/2019 | Chen et al. | |
| 2019/0250639 A1 | 8/2019 | Xu et al. | |
| 2019/0258251 A1* | 8/2019 | Ditty | G05D 1/0274 |
| 2019/0259282 A1* | 8/2019 | Ji | B60W 30/18154 |
| 2019/0287396 A1 | 9/2019 | Sayin et al. | |
| 2020/0021961 A1 | 1/2020 | Chen et al. | |
| 2020/0168081 A1 | 5/2020 | Chen et al. | |
| 2020/0183002 A1* | 6/2020 | Lee | G01S 19/14 |
| 2020/0284883 A1 | 9/2020 | Ferreira et al. | |
| 2020/0290629 A1 | 9/2020 | Mine et al. | |
| 2020/0298859 A1 | 9/2020 | Ozay et al. | |
| 2020/0307589 A1 | 10/2020 | Li et al. | |
| 2020/0307616 A1* | 10/2020 | Nithiyanantham | G02B 27/0093 |
| 2020/0307634 A1* | 10/2020 | Yashiro | B60W 60/0018 |
| 2021/0018243 A1 | 1/2021 | Zhang et al. | |
| 2021/0035378 A1 | 2/2021 | Lekutai | |
| 2021/0094577 A1* | 4/2021 | Shalev-Shwartz | B60W 60/001 |
| 2021/0109535 A1 | 4/2021 | Tansey | |
| 2021/0118294 A1 | 4/2021 | Chen et al. | |
| 2021/0179143 A1 | 6/2021 | Shin et al. | |
| 2021/0183243 A1 | 6/2021 | Mobasser | |
| 2021/0188319 A1 | 6/2021 | Xu et al. | |
| 2021/0197852 A1 | 7/2021 | Fairfield et al. | |
| 2021/0200231 A1 | 7/2021 | Zhu | |
| 2021/0200238 A1 | 7/2021 | Galoogahi et al. | |
| 2021/0211568 A1 | 7/2021 | Zhou et al. | |
| 2021/0213932 A1 | 7/2021 | Aggoune et al. | |
| 2021/0233392 A1 | 7/2021 | Mcconnell | |
| 2021/0233396 A1 | 7/2021 | Guo et al. | |
| 2021/0237769 A1 | 8/2021 | Ostafew | |
| 2021/0240148 A1 | 8/2021 | Cheriton | |
| 2021/0240197 A1 | 8/2021 | Shalev-Shwartz et al. | |
| 2021/0241610 A1 | 8/2021 | Matesevac, III et al. | |
| 2021/0241624 A1 | 8/2021 | Kan et al. | |
| 2022/0024461 A1 | 1/2022 | Takei et al. | |
| 2023/0061098 A1* | 3/2023 | Kim | B60W 60/0027 |
| 2023/0136682 A1* | 5/2023 | Zhang | B60W 50/14 701/23 |
| 2023/0160707 A1* | 5/2023 | Kibalama | B60L 50/61 701/22 |

FOREIGN PATENT DOCUMENTS

| | | |
|---|---|---|
| KR | 101672133 B1 | 11/2016 |
| WO | 20190136694 A1 | 1/2019 |
| WO | 2021078392 A1 | 4/2021 |
| WO | 2021089150 A1 | 5/2021 |

OTHER PUBLICATIONS

Heavin, "No More Red Lights? Proposed System for Self-Driving Cars Eliminates Need to Stop," University of Missouri College of Engineering, 17 pages, Mar. 15, 2021. Accessed Aug. 11, 2021.

Li et al; "An Improved Traffic Lights Recognition Algorithm for Autonomous Driving in Complex Scenarios," Journals Sage Publications.com, 33 pages, May 24, 2021, Accessed Aug. 11, 2021.

Moser et al; "Cooperative Adaptive Cruise Control Applying Stochastic Linear Model Predictive Control Strategies," Conference Paper, 7 pages, Jul. 2015.

Robert, "Linking Self-Driving Cars to Traffic Signals Might Help Pedestrians Give them the Green Light," School of Information, University of Michigan, 6 pages, Apr. 21, 2020. Viewed Aug. 1, 2021.

Sama Inc., "The Traffic Light Problem for Autonomous Vehicles," 7 pages, Apr. 23, 2020. Accessed Aug. 11, 2021.

Seredynski et al; "Comparison of Green Light Optimal Speed Advisory Approaches," Conference Paper, 7 pages, Oct. 2013.

Extended European Search Report for EP 22203428.2 issued Jul. 17, 2023, 8 pages.

* cited by examiner

NON-SELFISH TRAFFIC LIGHTS PASSING ADVISORY SYSTEMS

BACKGROUND

Traffic lights significantly influence fuel consumption. Various groups have discussed strategies for controlling a vehicle to optimize travel through a series of traffic lights. A "stop and go" strategy corresponds to driving at full speed up until a short distance ahead of a traffic light, bringing the vehicle to a full stop (if required) at the light, and when the no-go period ends, accelerating back to full speed. This strategy tends to waste fuel due to excessive acceleration and deceleration, as compared to other strategies. A "slow and go" strategy adjusts vehicle speed ahead of a traffic light to avoid full stop and hard acceleration, reducing fuel usage. For a single vehicle, operated in isolation, or operated without accounting for reactions of other vehicles, slow and go may be more efficient than a stop and go strategy.

However, "slow and go" can adversely affect other vehicles. For example, a first vehicle using a slow and go strategy may cause a following vehicle to be forced to stop at a traffic light that it would have been able to pass through if the first vehicle travelled at a higher speed. Overall performance of a group of vehicles, including for example contemplation of combined fuel consumption, average or total time of arrival, emissions, etc. may be sub-optimal if each vehicle only considers its own performance. New and alternative solutions that can improve group level efficiency are desired.

Overview

The present inventors have recognized, among other things, that a problem to be solved is the need for new and/or alternative strategies for optimizing vehicle behavior when determining velocity profiles to implement along a travel route that includes traffic lights.

A first illustrative and non-limiting example takes the form of a vehicle controller for a first vehicle, comprising one or more sensors for sensing conditions outside of the first vehicle and a transceiver for communicating with an off-board communication system, the vehicle controller configured to determine whether a second vehicle trailing the first vehicle is within a following distance of the first vehicle; if the second vehicle is within the following distance, adopt a first traffic-light approach method; and if the second vehicle is not within the following distance, adopt a second traffic-light approach method.

Additionally or alternatively, if the second vehicle is within the following distance, the vehicle controller is further configured to: model a second vehicle trajectory for the second vehicle relative to at least one upcoming traffic light in a planned travel path; calculate first vehicle trajectory to allow the first vehicle and the second vehicle to pass the at least one upcoming traffic light.

Additionally or alternatively, the first traffic-light approach method is configured as follows: the vehicle controller determines a first velocity profile for passing at least one upcoming traffic light, the upcoming traffic light having go-periods and no-go periods, such that the upcoming traffic light is passed by the first vehicle during a first go-period; the vehicle controller determines whether the first velocity profile would enable the second vehicle to pass the upcoming traffic light during the first go-period and, if so, implementing the first velocity profile to control the first vehicle; otherwise, the vehicle controller determines whether a second velocity profile would enable the second vehicle to pass the upcoming traffic light during the first go period and either: if so, implementing the second velocity profile to control the first vehicle; if not, implementing the first velocity profile to control the first vehicle.

Additionally or alternatively, the vehicle controller determines the first velocity profile by performing a cost function minimizing routine for the first vehicle itself without considering the second vehicle; the vehicle controller determines the second velocity profile by performing a cost function minimizing routine for the first and second vehicles as a group.

Additionally or alternatively, the first traffic-light approach method is configured as follows: the vehicle controller determines a first velocity profile for passing at least one upcoming traffic light, the upcoming traffic light having go-periods and no-go periods, such that the upcoming traffic light is passed during a first go-period; the vehicle controller analyzes the first velocity profile relative to a maximum speed rule to determine whether the first velocity profile deviates below the maximum speed rule by a predetermined threshold and: if the first velocity profile does not deviate below the maximum speed rule by the predetermined threshold, the vehicle controller is configured to implement the first velocity profile to control the first vehicle; otherwise the vehicle controller determines a second velocity profile to cause the first vehicle to pass the upcoming traffic light during the first go period at a point in time that is earlier than a point in time which the first vehicle would pass the upcoming traffic light using the first velocity profile, and then implements the second velocity profile.

Additionally or alternatively, the first and second traffic-light approach methods are configured for use with traffic lights having go periods and no-go periods, and the transceiver is configured for obtaining data indicating when go periods and no-go periods are to occur; if the second vehicle is within the following distance, the vehicle controller is configured to communicate with the second vehicle to obtain one or more second vehicle travel parameters; the first traffic light approach method includes analyzing the second vehicle travel parameters to determine whether the first vehicle and second vehicle can pass a traffic light during a first go period of the traffic light.

Additionally or alternatively, the vehicle controller is configured to implement the first traffic light approach method as follows: calculating a first optimized control solution for the first vehicle without considering any parameters related to the second vehicle; determining whether the first optimized control solution would prevent the second vehicle from passing the upcoming traffic light during a first go period; if so, determining whether the first optimized control solution can be modified without violating a constraint of the first vehicle to allow the second vehicle to pass the upcoming traffic light during the first go period; and, if so, calculating and implementing a second optimized control solution for the first vehicle that deviates from the first optimized control solution to allow the second vehicle to pass the traffic light during the go period.

Additionally or alternatively, the vehicle controller is configured to implement the first traffic light approach method as follows: calculating a first optimized control solution for the first vehicle without considering any parameters related to the second vehicle; determining whether the first optimized control solution would prevent the second vehicle from passing the upcoming traffic light during a first go period; if so, determining whether the first optimized control solution can be modified without violating a constraint of the first vehicle to allow the second vehicle to pass the traffic light during the first go period; and, if not, implementing the first optimized control solution for the first vehicle, and communicating inability to accommodate the second vehicle passing the traffic light during the first go period.

Additionally or alternatively, the vehicle controller is configured to implement the first traffic light approach method as follows: calculating a first optimized control solution for the first vehicle without considering any parameters related to the second vehicle and determining a first travel trajectory for the first vehicle; obtaining a second travel trajectory from the second vehicle; determining whether the first travel trajectory would cause the second vehicle to be unable to implement the second travel trajectory; and: if so, determining whether a second optimized control solution for the first vehicle would provide a third travel trajectory allowing the second vehicle to implement the second travel trajectory, wherein the second optimized control solution for the first vehicle is configured to meet an applicable set of limits and constraints on operation of the first vehicle; and either: implementing the second optimized control solution for the first vehicle if the third travel trajectory would allow the second vehicle to implement the second travel trajectory; or communicating to the second vehicle that the second travel trajectory cannot be accommodated.

Additionally or alternatively, the vehicle controller is configured to obtain, using the transceiver, one or more parameters of one or more traffic lights including definition of go and no-go periods for the one or more traffic lights.

Another illustrative, non-limiting example takes the form of a vehicle control method comprising: identifying, in a first vehicle, presence of at least one following vehicle within a following distance; assessing a prediction horizon for the first vehicle and identifying at least one traffic light having go and no-go periods in the prediction horizon; and selecting a speed control strategy for the first vehicle relative to the at least one traffic light in the prediction horizon to limit degradation of a travel metric of the at least one following vehicle without violating a constraint of the first vehicle.

Additionally or alternatively, the selected speed control strategy is configured to enable the first vehicle and the following vehicle to both pass an identified traffic light during a first go period of the identified traffic light to thereby limit degradation of the travel metric; and the method further comprises communicating the speed control strategy from the first vehicle to the at least one following vehicle.

Additionally or alternatively, the step of selecting a speed control strategy for the first vehicle is performed as follows: calculating a first velocity profile for the first vehicle to pass the identified traffic light in the prediction horizon, the first velocity profile being calculated to minimize energy consumption of the first vehicle; determining that the first velocity profile for the first vehicle would not allow the at least one following vehicle to pass the identified traffic light in the first go period; calculating a second velocity profile which allows the at least one following vehicle to pass the identified traffic light in the first go period; and applying control parameters associated with the second velocity profile as the selected speed control strategy.

Additionally or alternatively, the step of selecting a speed control strategy for the first vehicle is performed as follows: calculating a first velocity profile for the first vehicle to pass the identified traffic light in the prediction horizon, the first velocity profile being calculated to minimize wear on one or more of brakes and tires of the first vehicle; determining that the first velocity profile for the first vehicle would not allow the at least one following vehicle to pass the identified light in the first go period; calculating a second velocity profile which allows the at least one following vehicle to pass the identified traffic light in the first go period; and applying control parameters associated with the second velocity profile as the selected speed control strategy.

Additionally or alternatively, the first vehicle communicating a first velocity plan for the first vehicle to a first following vehicle; the first vehicle receiving, responsive to the communicated first velocity plan, a requested modification to the first velocity plan from the first following vehicle; the first vehicle determining the requested modification can be accommodated without degrading an optimized metric of the first vehicle that would result from use of the first velocity plan beyond a predetermined degradation threshold; the first vehicle communicating acceptance of the requested modification to the first following vehicle; and the first vehicle calculating and implementing a second velocity plan that accommodates the requested modification.

Additionally or alternatively, the first vehicle communicating a first velocity plan for the first vehicle to a first following vehicle; the first vehicle receiving, responsive to the communicated first velocity plan, a requested modification to the first velocity plan from the first following vehicle; the first vehicle determining the requested modification would violate the constraint of the first vehicle; the first vehicle communicating rejection of the requested modification to the first following vehicle; and the first vehicle implementing a first velocity plan.

Another illustrative, non-limiting example takes the form of a vehicle controller for a first vehicle, the first vehicle including a communication transceiver for communicating with at least one other vehicle, the vehicle controller configured to: receive velocity profile data from a second vehicle which is ahead of the first vehicle in a planned path of the first vehicle; determine whether the received velocity profile data will negatively affect a travel metric of the first vehicle relative to at least one traffic light in the planned path; communicate a request to the second vehicle to adjust the received velocity profile data to accommodate the first vehicle passing the at least one traffic light; receive a response either accepting or rejecting the request to the second vehicle; calculate and implement a first velocity profile for the first vehicle if the request is accepted; and calculate and implement a second velocity profile for the first vehicle if the request is rejected.

Additionally or alternatively, the first velocity profile is configured to allow the first vehicle to pass the at least one traffic light in a first go period, and the second velocity profile is configured to allow the first vehicle to pass the at least one traffic light in a second go period after the first go period.

Additionally or alternatively, the first and second velocity profiles are calculated to minimize energy consumption by the first vehicle.

Additionally or alternatively, the first and second velocity profiles are calculated to achieve an earliest time of arrival at a destination for the first vehicle.

Additionally or alternatively, the first and second velocity profiles are calculated to minimize wear of one or more subsystems or components of the first vehicle.

Another illustrative, non-limiting example takes the form of a vehicle control method operable in a first vehicle, comprising: a first vehicle identifying presence of at least one following vehicle within a following distance; the first vehicle identifying at least one traffic light within a prediction horizon encompassing at least a portion of a planned route for the first vehicle; the first vehicle obtaining data about the at least one following vehicle regarding at least one parameter of the at least one following vehicle; the first vehicle calculating a first velocity profile for the first vehicle to use along the planned route to pass the at least one traffic light including ensuring that the at least one following vehicle can pass the at least one traffic light in a same go period as the first vehicle; and the first vehicle using the calculated velocity profile to control velocity along the planned route to pass the at least one traffic light.

Another illustrative, non-limiting example takes the form of a vehicle control method comprising: identifying at least first and second vehicles in proximity to one another and sharing a travel path, the first vehicle being ahead of the second vehicle in the travel path; identifying at least one traffic light in the travel path; obtaining vehicle data for the first and second vehicles, and traffic control data for the at least one traffic light; performing a cost minimization calculation to calculate each of a first velocity profile for the first vehicle, and a second velocity profile for the second vehicle, in which the cost minimization calculations account for the traffic control data associated with the at least one traffic light; and communicating the first velocity profile to the first vehicle for the first vehicle to use, and the second velocity profile to the second vehicle for the second vehicle to use; wherein the first and second velocity profiles result in less energy utilization for the first and second vehicles than if the first and second velocity profiles were separately calculated.

This overview is intended to provide an introduction to the subject matter of the present patent application. It is not intended to provide an exclusive or exhaustive explanation. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As used herein, a "traffic light" is intended to mean an apparatus that generates a traffic control signal to indicate to vehicles/travelers along a route to either pass or not pass during a certain time interval through a location controlled by the traffic light. An example is a traditional stop light. As also used herein, a "go period" associated with a traffic light indicates the time period when the traffic light provides an indication that vehicles traveling on a controlled path are to pass by the traffic light, as contrasted to a "no-go period" during which the traffic light generates an indication that vehicles are not to pass by the traffic light. Some traffic lights will also have a "caution period" during which a signal is generated to indicate the upcoming end of the go period and imminent initiation of the no-go period. Some lights may also have a "start period" during which the light provides an indication that the no-go period is nearing its end time and the go period is about to begin. Some examples below may treat, for example, a caution period as part of the go period, and the start period as part of the no-go period, or the reverse, if desired. The specific manner and configuration of a traffic light can vary. The use of the word "light" is not intended to be limiting; to the extent autonomous vehicles become more common, visual cues may be replaced by other indicators, without deviating from the concepts disclosed herein. Such indications may be one or more of visual, sonic, audible, mechanical, or transmitted such as by a wireless (cellular, RF, etc.) signal.

Traffic lights form part of the road infrastructure on which vehicles travel. Vehicles that may implement the methods herein, or which include the controllers herein, or which embody the systems herein, may take many forms. As used herein, autonomous vehicles can implement the methods and systems disclosed. Autonomous vehicles may include entirely driverless vehicles, as well as semi-autonomous vehicles having a vehicle controller that determines one or more travel parameters and makes ongoing determinations regarding the one or more travel parameters, while also having a driver who may fully control one or more other parameters or who may be present to adjust parameters at his or her option. Controlled travel parameters may include lane management, turns, velocity, acceleration deceleration, etc. Some examples may also be implemented as part of a cruise control strategy and/or "auto-pilot" type driving modes, in which a vehicle travels under at least partially automated control while also having a driver present and/or exercising some degree of control over the vehicle. All such vehicles can be considered "autonomous vehicles," as used herein, including those in which all driving functions, or at least one driving function is controlled all of the time or part of the time.

Figure 1:
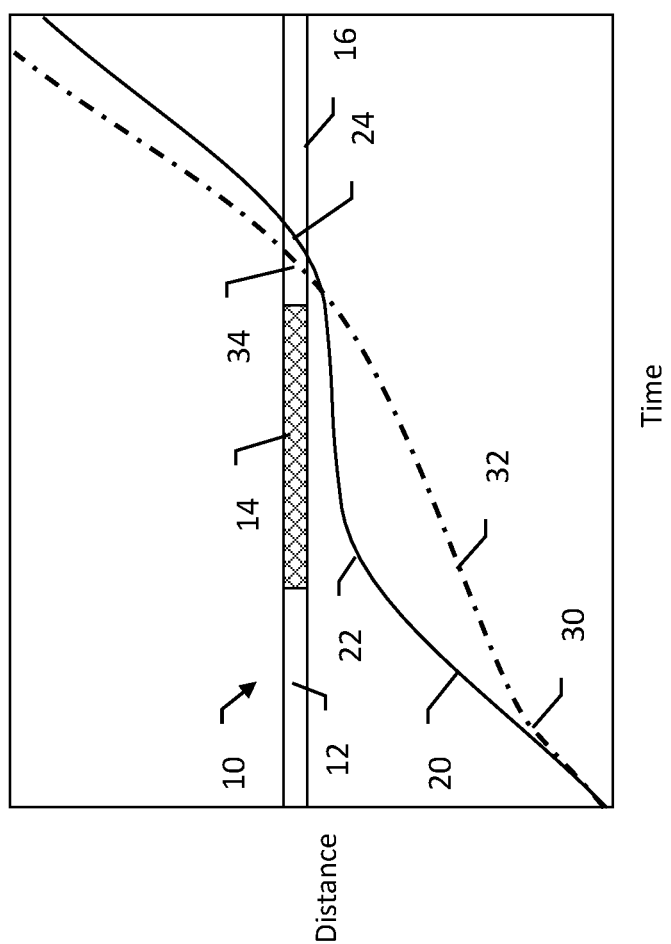
FIG. 1 is a diagram comparing stop and go and slow and go control strategies.

FIG. 1 is a diagram comparing stop and go and slow and go control strategies. As noted above, a stop and go strategy for passing through a portion of roadway having a traffic light may include travelling at relatively high speed (such as at a prevailing speed of surrounding traffic/vehicles, at an optimized speed for achieving a travel goal (maximizing fuel efficiency, for example), a driver/operator preferred velocity setpoint, or a speed limit applicable to the roadway) until reaching the traffic light, and then decelerating quickly to a stop if the traffic light is not in a go period. Once the no-go period ends, the stop and go strategy includes accelerating back to the relatively high speed used previously. In the diagram, the state of the traffic signal is indicated at 10, with go periods 12 and 16 before and after a no-go period 14. The stop and go strategy is illustrated by the solid line 20, which is shown travelling at relatively high speed (in the drawing, a vertical line would represent infinite speed, and horizontal line represents a full stop) until inflection point 22, when the vehicle slows ahead of the traffic light and remains so until inflection point 24 when the vehicle accelerates once it can do so while still passing the traffic light during a go period. If the vehicle reaches the traffic light during the no-go period, or another vehicle which is itself stopped, the vehicle may stop completely.

A slow and go strategy is represented by the dash-dot line 30. In the example, the vehicle, anticipating the no-go period 14, decelerates as shown by the portion of the line at 32, and reaches the traffic light just as the traffic light begins the go period 16. By not stopping fully, a vehicle travelling along line 32 will use less fuel by reducing the amount of acceleration needed to resume travel at relatively high speed, as shown at 34. The slow and go strategy may also reduce wear of the vehicle brakes and tires, among other possible benefits. Avoiding harder acceleration leads to lowered energy consumption, which in turn lowers fuel consumption (and emissions). Various studies have modelled stop and go as well as slow and go strategies to conclude that the slow and go strategy provides better fuel economy than the stop and go strategy. For a single vehicle travelling alone, slow and go may also reduce the time needed to reach the end point as illustrated in the drawing. The problem of course, is that vehicles are rarely alone on the road.

Figure 2:
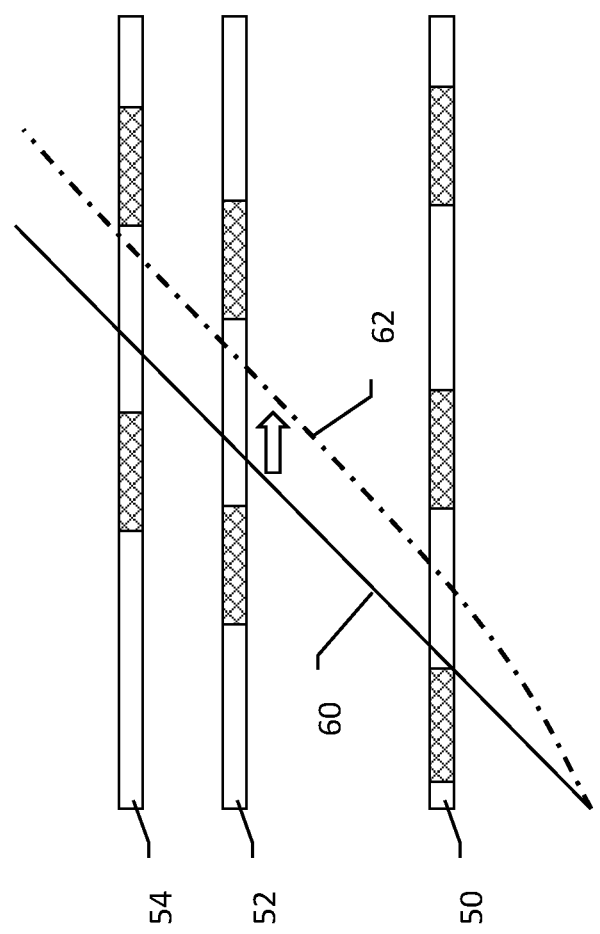
FIGS. 2-4 are diagrams illustrating the interaction of two vehicles relative to traffic lights.
Figure 3:
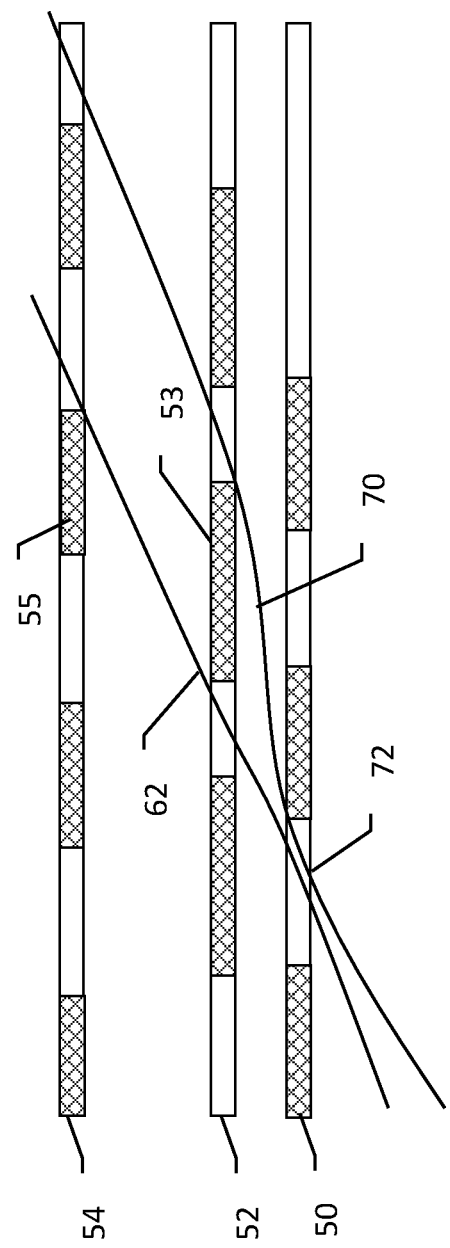
Figure 4:
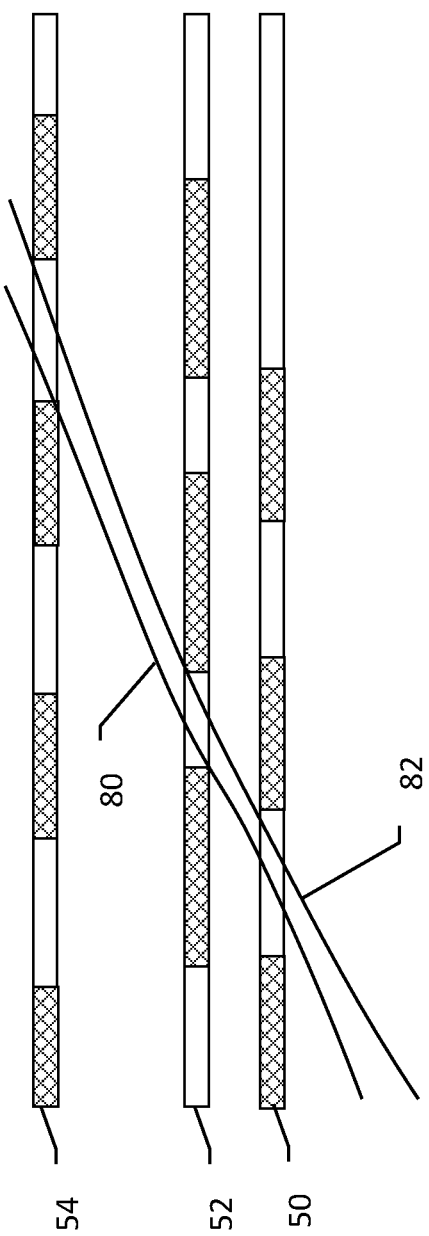

FIGS. 2-4 are diagrams illustrating the interaction of two vehicles relative to traffic lights. In FIG. 2, three traffic lights are represented at 50, 52 and 54, with no-go periods shown in cross hatching. First and second vehicle control strategies are shown at 60 and 62. If reduced fuel usage is a goal, travelling at a slightly slower speed can reduce losses due to air drag, tire friction, and other losses. However, the traffic lights influence such a strategy as well; it would be desirable to avoid unnecessarily slowing for the traffic lights or waiting out a no-go period. Thus, in FIG. 2, a vehicle passing the three lights may optimize its own behavior by travelling as shown by dot-dash line 62, rather than solid line 60 to reduce fuel consumption while also passing all three traffic lights with minimal delay. The vehicle uses a slow and go strategy to time passing each light 50, 52, 54 toward the end of a go period for each light. A reasonable approach for a solitary vehicle would be to travel along the trajectory shown at 62.

However, FIG. 3 illustrates the influence of one vehicle on another. Here, the three traffic lights 50, 52, 54 are shown differently disposed, and with different go and no-go periods than in FIG. 2. A first vehicle travels along path 62, which is optimized for the first vehicle only. A second vehicle travels along path 70, following the first vehicle. For the first light 50, the second vehicle is able to pass the light 50 using the same go period as the first vehicle, as indicated at 72. However, the first vehicle has adopted path 62, so that it will pass the second traffic light 52 just before the end of a go period in order to avoid slowing down for a no-go period 55 of the third light 54. The result is that the second vehicle cannot pass the second traffic light 52 during the same go period as the first vehicle. The second vehicle, anticipating that it will reach the second traffic light 52 during a no-go period 53, slows down significantly using a slow and go approach, and passes the second light 52 and third light 54 during a later go period. In the illustration, the second vehicle is delayed and uses more fuel (due to deceleration and subsequent acceleration) because of decisions made by the first vehicle. One way of describing the scenario of FIG. 3 is that the first vehicle, by making decisions that only consider its own optimization, is using a selfish control method.

The vehicles and vehicle control strategies described herein, whether autonomous or semi-autonomous, are not described with consideration of possible passing strategies in which a vehicle may change lanes to pass another vehicle. The present disclosure focuses on longitudinal control of a vehicle, and does not address the case in which a vehicle has a higher level of autonomy including lateral control needed to change lanes. Some examples may be useful in particular in locations where lane usage is restricted, such as in areas where freight vehicles are restricted to using one lane, or in the contemplated case in which autonomous vehicles are restricted to one lane. The strategies described herein may also be used in vehicles having lateral control autonomy.

FIG. 4 shows a more optimal outcome for the two vehicles. Now, the first vehicle travels along trajectory 80, a bit faster than in the example of FIG. 2, allowing the second vehicle to use a very similar trajectory 82. A small reduction in the efficiency of the first vehicle occurs due to the increased speed of the vehicle, but the benefit to the second vehicle outweighs the added cost arising in the first vehicle. For purposes of creating a control methodology, the designer may create a weighted benefit comparison, allowing tuning between costs and benefits to each vehicle as well as the overall "group" of vehicles, where the group may include the first and second vehicles, as well as one or more additional vehicles.

Figure 5:
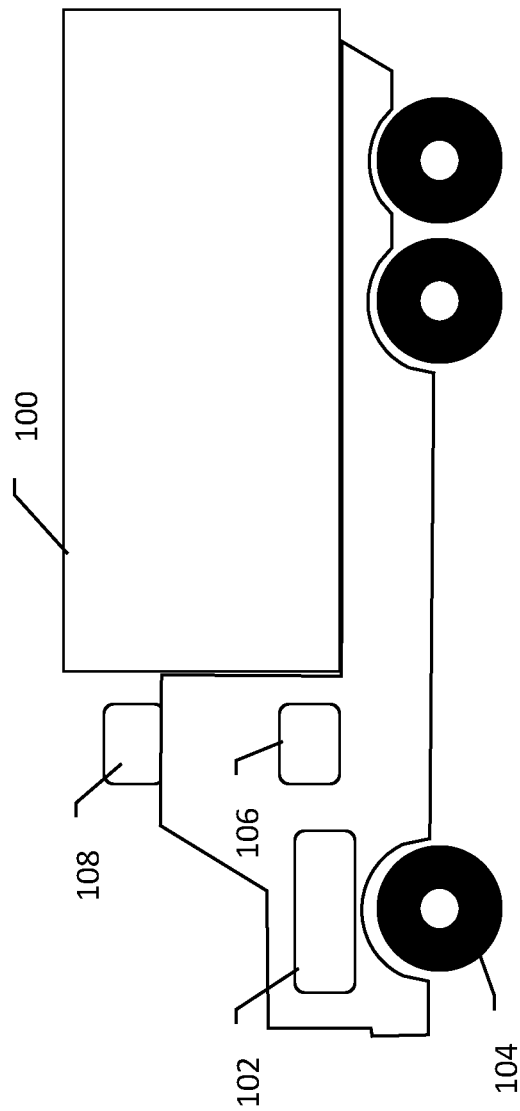
FIG. 5 shows an illustrative vehicle.

FIG. 5 shows an illustrative vehicle. The vehicle 100 may be, for example and without limitation, a passenger vehicle, a bus, a truck, a tractor-trailer, or any other desired vehicle type; a three-axle truck is shown for illustrative purposes. The vehicle includes a motive power source 102, which may be an electric motor, an internal combustion engine, or any other desired source of mechanical drive for moving the vehicle. Wheels are shown at 104. The motive power source 102 may receive energy from a fuel tank, battery or fuel cell. A vehicle controller is shown as a block 106. The vehicle controller 106 may include, for example and without limitation, one or more microcontrollers, microprocessors, application specific integrated circuits (ASICs), state machines, various logic and other signal processing circuits, any suitable memory such as a non-transitory memory, a Flash memory, a disk, etc. The memory may store, for example and without limitation, machine or computer readable instructions for performing the methods described herein, including methods of communicating with a second vehicle, communicating with infrastructure, calculating velocity profiles, modeling other vehicle behaviors, modelling interval vehicle actions to identify optimized control strategies to achieve fuel efficiency or wear reduction goals, to implement velocity profiles by commanding acceleration, deceleration, etc. including transmission and engine settings desirable to provide such velocity profile control, as well as recording data related to vehicle operations, fuel usage, settings, performance, etc. Such memory may be reconfigurable or rewritable to allow upgrade as well as customization, as desired. The vehicle controller 106 may include a high level controller and a plurality of subsystem controllers in some examples, each with its own memory to store instructions and settings as needed, connectable, for example, by a controller area network (CAN) or other communications infrastructure within the vehicle.

The vehicle controller 106 may include or may be coupled to a communication apparatus 108, such as a transceiver for cellular or other wireless or wired communication, including for example and without limitation broadband, cellular, WiFi, RF communication, Bluetooth, satellite, etc., including for example an antenna and associated circuitry for sending and/or receiving messages to a central server or off-vehicle memory or other system. A communication apparatus 108 may also be configured for communication with surrounding infrastructure, including for example and without limitation, traffic lights, as well as server and/or cloud communication for fleet management or to obtain or share other data (weather, traffic conditions, etc.).

Figure 6:
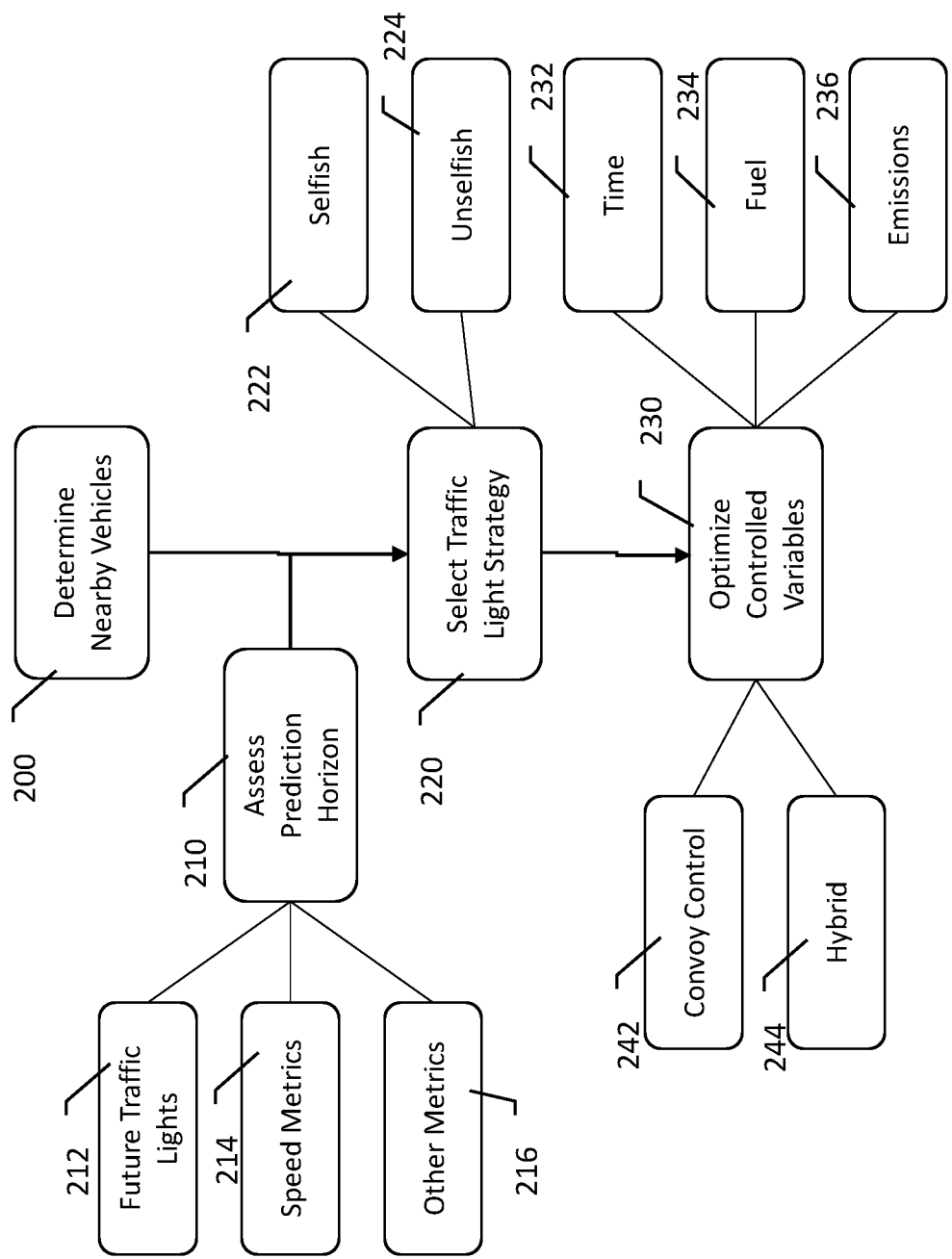
FIGS. 6-7 are block process flow diagrams.
Figure 7:
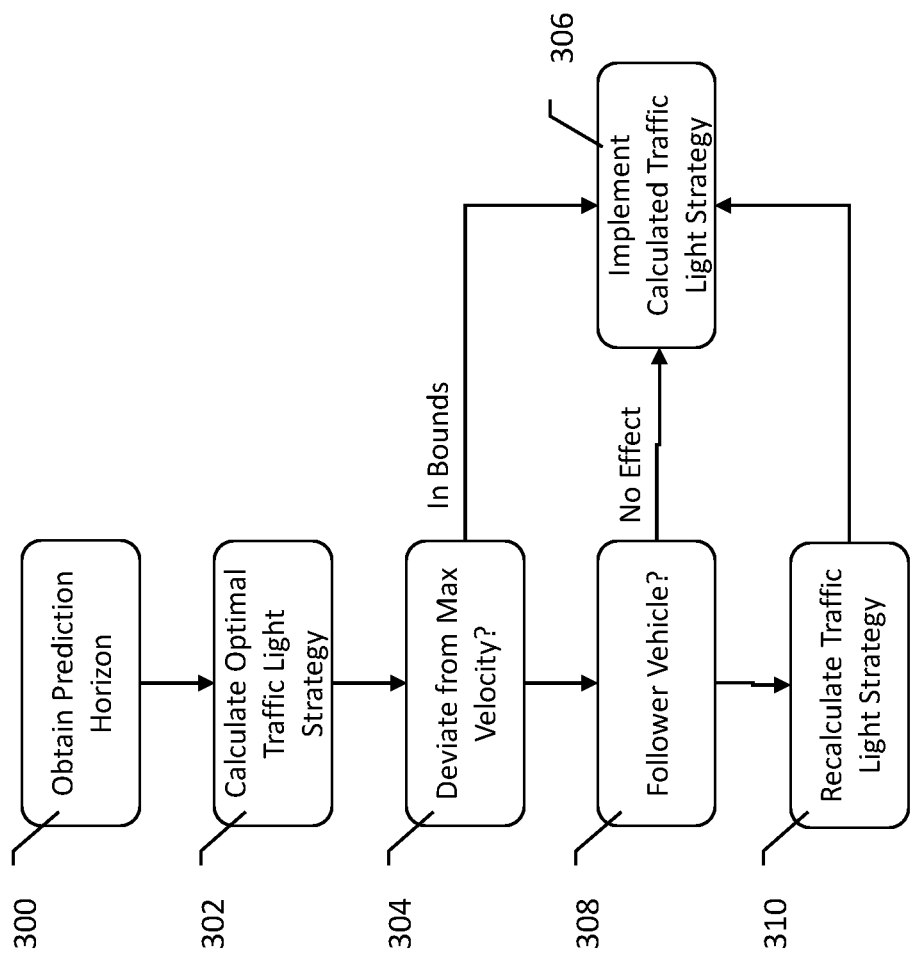

FIGS. 6-7 are block process flow diagrams. Starting in FIG. 6, at block 200, the "Ego" vehicle determines whether there are nearby vehicles. To provide easier reference, the vehicle having a controller, computer or other processor performing method steps is referred to as the Ego vehicle. Other vehicles in the vicinity may be referred to as nearby vehicle (any vehicle located within a predetermined distance, where the predetermined distance may be proportional to a maximum speed or prevailing speed on a relevant road). In some cases, the Ego vehicle may form or define a fleet of vehicles including those vehicles which are commonly controlled, owned, or simply nearby, and a nearby fleet vehicle may be a vehicle in the same fleet as the Ego vehicle which is located within a predetermined distance. In some examples, nearby capable vehicles may be identified, where "capable" refers to the ability of the nearby vehicle to communicate with the Ego vehicle, whether or not it is part of the same fleet as the Ego vehicle. Nearby vehicles and nearby fleet vehicles may be further narrowed in this context to refer to those which are travelling along the same route and in the same direction as the Ego vehicle.

The determination at 200 may be performed by communicating with one or more nearby vehicles, by attempting such communication, by communication with a central server or a network, and/or by observation such as by using Lidar or a visual sensor to identify nearby vehicles. For example, if communication is attempted by issuing a polling signal to surrounding vehicles (using known wireless communication methods) and no response is received, then the Ego vehicle may determine that there are no nearby vehicles. The Ego vehicle may communicate with a central server or with a communications network, such as a cellular or broadband network, to determine whether another vehicle is nearby. If so equipped, an infrastructure network may be enabled to provide nearby vehicle data, such as a count of vehicles travelling in the same direction as the Ego vehicle on the same route, and such communication may be used by the Ego vehicle to determine whether there are nearby vehicles. The Ego vehicle may combine multiple methods in block 200, such as by using a camera, radar, and/or Lidar, along with wireless communication, to identify nearby vehicles, where the use of multiple approaches to identifying nearby vehicles reflects the fact that roads may be used by vehicles of varying ages, technologies and types. In some examples, block 200 may only identify nearby fleet vehicles or nearby capable vehicles.

The Ego vehicle also assesses the prediction horizon ahead of it, as indicated at 210. This may include determining the presence and status of upcoming or future traffic lights, as indicated at 212, as well as obtaining speed metrics including the average or prevailing speed of nearby vehicles, the maximum and/or minimum speed (speed limits) on the route being used, and any other metrics such as weather conditions that may affect the prediction horizon and desirable speeds. That is, in poor road conditions (wet or icy, for example), the Ego vehicle may adopt different control strategies for steering, braking and accelerating, than the vehicle would in other road conditions, such as by penalizing or placing limits on steering maneuvers, acceleration and/or deceleration.

The Ego vehicle then selects a traffic light strategy using the knowledge of nearby vehicles from block 200 and the assessment of the prediction horizon from block 210. A "selfish" traffic light strategy may be selected, as indicated at 222. In the "selfish" strategy, the Ego vehicle implements a traffic light strategy that does not account for the effects of its own actions on surrounding vehicles. For example, a slow and go strategy may be implemented to obtain a maximum fuel efficiency by slowing the vehicle to pass through those traffic lights that are present within the prediction horizon without leaving space or time for following vehicles to pass through a go period, as illustrated in FIGS. 2-3 above, at line 62. An unselfish strategy may instead be selected if there are other nearby vehicles, as indicated at 224. Here, the driving approach illustrated with line 62 of FIGS. 2-3 may be adjusted as shown by FIG. 4 to account for one or more surrounding vehicles. In some examples, the selfish strategy is selected in the following instances:

If no nearby vehicles are detected. In the absence of such vehicles, the Ego vehicle can optimize its traffic light strategy without accounting for other vehicles since none are present.

If nearby vehicles are detected, but none of the nearby vehicles are nearby fleet vehicles. Here, the Ego vehicle is configured to optimize only for purposes of the fleet to which it belongs. It may be, for example, that the performance of other vehicles that are not part of the fleet cannot be controlled or relied upon to improve efficiency even if the Ego vehicle adjusts its own performance.

If nearby vehicles are detected, but none of the nearby vehicles are nearby capable vehicle. Here, it can be assumed that nearby capable vehicles may adjust performance cooperatively with the Ego vehicle, and therefore unselfish optimization steps taken by the Ego vehicle are likely to improve overall transportation system efficiency or performance, for example.

Having selected a traffic light strategy at block 220, the Ego vehicle then proceeds to optimize controlled variables. Optimization may be performed to enhance the time in transit, as indicated at 232, to minimize fuel consumption 234, and/or to minimize emissions 236. In some examples, other requirements or optimization variables may be included, such as reduced wear of a vehicle subsystem or components, such as the brakes, tires, transmission, airflow system components (valves, turbocharger, etc.), or other vehicle componentry, or any other combination or factor. In some examples, the Ego vehicle may be part of a designated fleet or convoy such as a group of vehicles transporting an oversized cargo wherein the convoy is subject to a requirement to travel not further than a certain distance (actual distance or travel time) apart from one another. The Ego vehicle may optimize performance as part of an overall strategy to optimize a convoy of fleet vehicles 242, or to optimize performance to allow surrounding capable vehicles to improve performance in a hybrid model 244. By "convoy," it is meant that a group of vehicles operates together using centrally controlled instructions. A hybrid approach 244 is one in which vehicles do not explicitly share instructions, but do exchange data and/or optimize their own behavior while accounting for other vehicles, as shown in several examples below.

FIG. 7 is a block diagram for an illustrative example. Here, the Ego vehicle obtains prediction horizon data at 300, and calculates an optimal selfish traffic light strategy, as indicated at 302. Block 302 may include, for example, using the method as shown in FIG. 1 to calculate an optimized strategy for passing upcoming traffic lights that allows each light to be passed during a go period without undue delay, while keeping acceleration and deceleration events minimized. Next, the Ego vehicle determines whether the optimal traffic light strategy exceeds any constraints. For example, a constraint may limit deviation from the maximum velocity or speed along the path to a preset deviation boundary. In an example, a reduction in velocity from an optimized solution may be deemed to violate a preset deviation boundary if, for example, velocity is reduced by more than a set percentage (10%, 20%, 30%, etc.) from the velocity that could be obtained if no other vehicles were considered in the optimization. In another example, an increase in velocity relative to an optimized solution may be deemed to violate a preset deviation boundary if, for example, velocity is increased by more than a set percentage (10%, 20%, 30%, etc.) or amount (10 km/hr, 20 km/hr, etc.) relative to the velocity that would be obtained if no other vehicles were considered in the optimization. Deviation boundaries may be set for any parameter, including maximum acceleration, brake utilization, etc.

If the optimized path from block 302 does not exceed the boundary at block 304, the calculated strategy from block 302 is implemented, as indicated at 306. If there is a deviation of the vehicle speed from the posted maximum velocity (or user selected velocity target) along the chosen path, the method next determines whether any follower vehicles are present as indicated at 308. For example, if the vehicle's optimized solution would have it travel at a maximum velocity, it may not be necessary to consider other vehicles as the only changes that could be made would reduce velocity, which could only adversely affect trailing vehicles. In some examples, block 308 may be performed by polling or otherwise identifying any nearby vehicles using communications with the nearby vehicles, directly or over a network, and/or or by using other detectors such as a visual detection, radar, or Lidar, for example. A follower vehicle is a nearby vehicle travelling on the same route and in the same direction which is behind, as opposed to in front of, the Ego vehicle. If there are no follower vehicles, the method again progresses to block 306 to apply the strategy from block 302. If there is a follower vehicle, the method includes recalculating the traffic light strategy by taking into account the follower vehicle, as indicated at 310.

In more detail, the method of FIG. 7 may be as follows. The method starts by assuming that one or more vehicles in addition to the Ego vehicle (optionally, all such vehicles) have an optimizer that optimizes with respect to the vehicle in which the optimizer is located. Each vehicle, including the Ego vehicle, considers a slow and go strategy as a default option. The prediction horizon is segmented using at least the traffic lights (additional segmenting may be performed to account for other changes, such as changes in the quantity of lanes, grade, changes in maximum speed as defined by a speed limit, etc.). For each traffic light over the prediction horizon, or for each segment where segments are defined as the space between traffic lights, the average predicted velocity ahead of the traffic light or in the segment is calculated. If the average predicted velocity before any traffic light, or within any segment, deviates from the maximum allowed velocity by more than a chosen threshold, which might be given as an absolute speed or a percentage or fraction of the maximum allowed velocity, then further analysis occurs. If the nearby vehicles include a follower vehicle, then the strategy for the individual traffic light or segment in which the velocity deviation occurs is switched from slow and go to stop and go, so that the Ego vehicle will proceed more quickly to the traffic light than would occur with a slow and go strategy. If there is no follower vehicle, then no changes are made.

Figure 8:
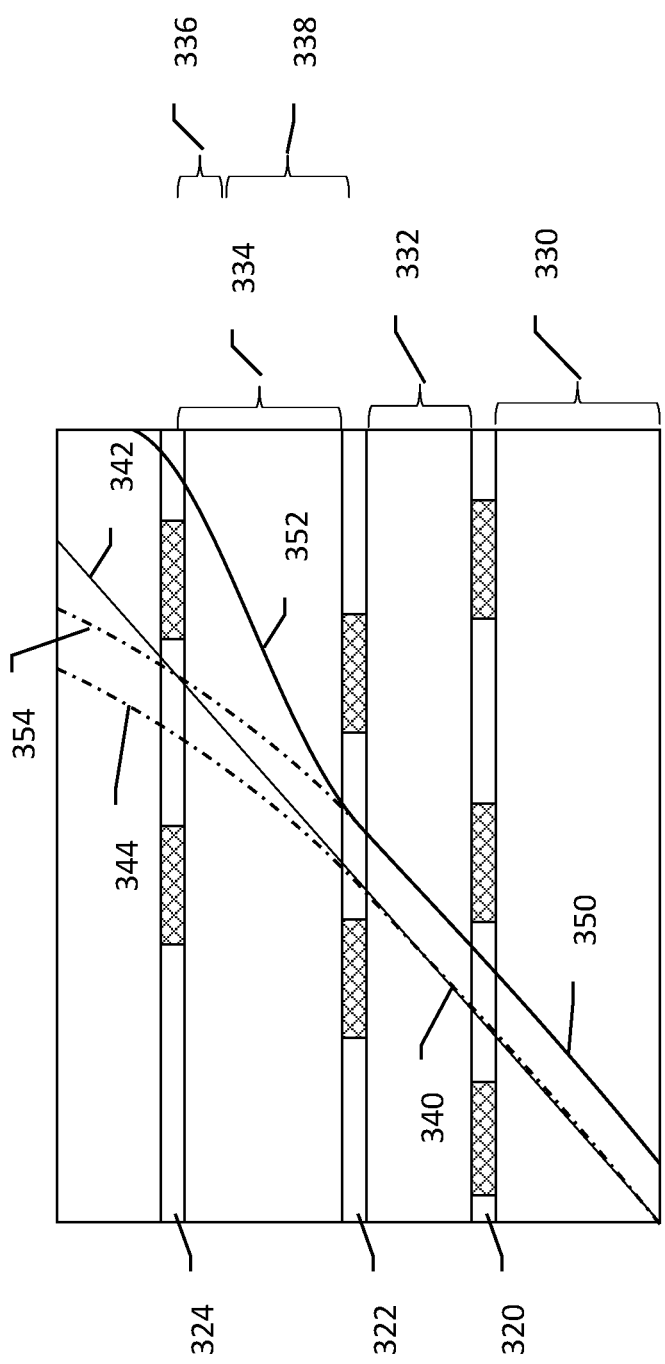
FIG. 8 is a diagram showing interaction of two vehicles relative to traffic lights.

FIG. 8 shows an adjustment in graphic form. In this example, three traffic lights are represented at 320, 322, 324, with cross hatching differentiating no-go periods from go periods for each light. The traffic lights 320, 322, 324 separate different speed limit zones 330, 332, 334 as well. In this example, zones 330 and 332 may have relatively lower maximum speed limits, while the third zone 334 has a higher speed limit. For example, zones 330, 332 may have 50 kilometer per hour (kph) speed limits, and zone 334 has a 70 kph speed limit.

An initially calculated ego vehicle speed profile is shown at solid line 340, which would allow use of a constant speed (optimized to avoid acceleration or deceleration) which is within each speed limit. For example, the speed represented at solid line 340 may be 46 kph. However, use of this relatively lower speed has an effect on a following vehicle travelling along line 350. Using the initial solution for the ego vehicle, starting at line 340 and ending as shown at 342, the following vehicle is forced to reduce speed to use a slow-and-go approach to the third traffic light 324, as shown at 352. This is not optimal for the following vehicle, as it not only is delayed by the third traffic light, it must decelerate and accelerate again when passing the third traffic light.

Referring back to FIG. 7, in an example, the maximum deviation in block 304 may be 20%, and so in zones 330 and 332, any speed above 40 kph (50 kph*(1−0.2)=40 kph) would meet the threshold of block 304, while a speed of at least 56 kph (70 kph*(1−0.2)=56 kph) would be the threshold for zone 334. In this example, then, for zone 334, the speed represented at line 342 cannot be used by the ego vehicle without first checking whether there is a following vehicle. In this case, there is a following vehicle, and the method of FIG. 7 calls for the ego vehicle to use a different strategy. In this example, the ego vehicle uses a stop and go strategy in zone 334, accelerating to the speed limit, for example, of 70 kph, as shown by the broken line at 344. Doing so allows the follower vehicle to also accelerate in zone 334, as shown at broken line 354. Now the follower vehicle is able to pass the third light 324 in an earlier go period than would have occurred if the ego vehicle used a "selfish" strategy.

An element of the strategy here is to break apart the prediction horizon in which the ego vehicle travels into separate segments. Each segment has as its beginning point and end point either a traffic light or a change in speed zone. In the example shown in FIG. 8, the speed zones and traffic lights line up exactly, so there are three segments to consider. Supposing, for example, that the distance traversed between the second and third traffic lights 322, 324 includes two different speed zones, then additional segments 336, 338 would take the place of segment 334. The segmenting of the prediction horizon for purposes of a method as in FIG. 7 can thus be used to define the velocity profile for the ego vehicle.

In an example, the traffic light passing strategy for the ego vehicle is determined by reference to each segment within the travel distance between traffic lights, with a slow and go strategy selected unless a follower vehicle is detected and the minimum speed rule is violated for any segment between traffic lights.

In another example, any violation of a threshold velocity rule may be evaluated at each predicted distance for a chosen sampling over the prediction horizon. That is, the speed threshold violation check may be sampled either in the distance domain (such as by defining a sampling distance of anywhere from 5 to 100 meters, or more or less) throughout the prediction horizon, or a speed violation check may be analyzed in the time domain (that is, a threshold violation may be checked at every 0.1 to 30 seconds of time, or more or less, in the prediction horizon).

Once a passing strategy for each individual traffic light is determined for the ego vehicle, the passing strategy is provided to an optimizer that optimizes the behavior of the ego vehicle over the prediction horizon. The optimizer may be on-board the vehicle, or it may be remote such as in another vehicle or at a central server, for example, or anywhere else as desired. A control algorithm, such as model predictive control (MPC) may be used to search profiles of the manipulated variables of the system that a chosen optimality criterion (such as, but not limited to, fuel consumption, time of arrival, emissions, absolute value of acceleration or deceleration, desired velocity tracking, maximum acceleration or deceleration, cumulative acceleration or deceleration in the prediction horizon, speed limits violation, safe distance from neighboring vehicles, etc.) is minimized. Then the first discrete time samples of the manipulated variables are applied to the system (ego vehicle), and feedback from the system is gathered at the next time instance. With the new information, the process is repeated. The decision process may be repeated alongside the optimization at each time instance, if desired, and new strategies for individual traffic lights are decided based on the updated information with each new time instance.

Figure 9:
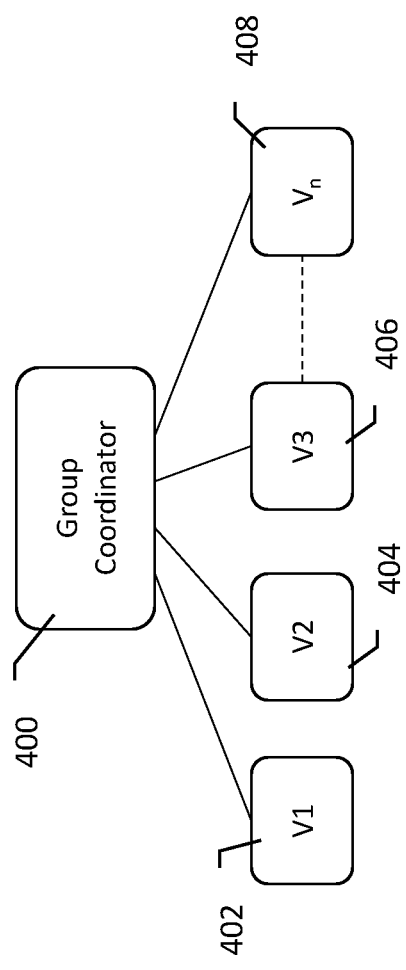
FIG. 9 shows an illustrative system with a central controller.

FIG. 9 shows an illustrative system with a central controller. In this example, a group coordinator 400 is communicatively linked to a plurality of vehicles 402, 404, 406, 408. The group coordinator 400 may be, for example, located in a virtual cloud, or may be one of the travelling vehicles. The group coordinator is responsible for optimizing the performance of the group of vehicles 402, 404, 406, 408 and communicates with each of the vehicles in the group to receive travel and/or vehicle parameters from each and to provide speed profiles or other instructions to each vehicle in the group. Operations in the group may be as shown in FIG. 10.

Figure 10:
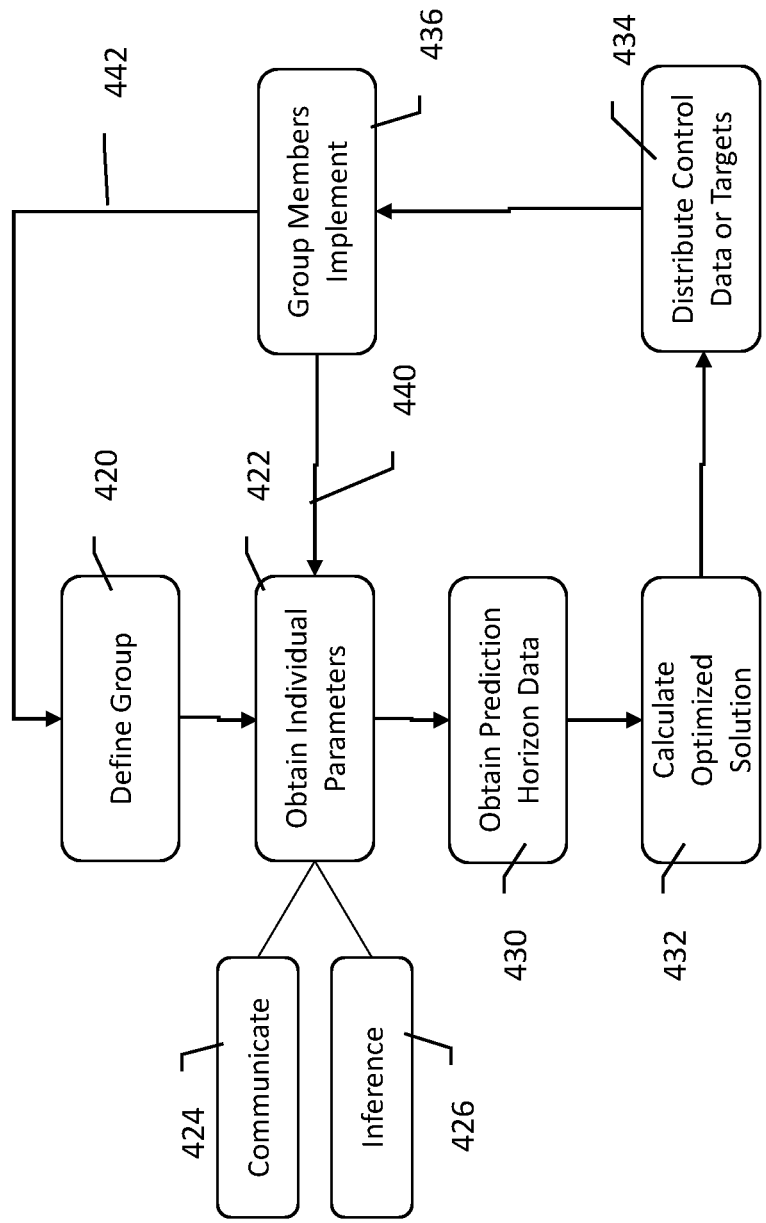
FIG. 10 is a block process flow diagram.

FIG. 10 is a block process flow diagram. The process may be performed at discrete time intervals (each 0.5, 1 or 2 seconds, or at longer or shorter intervals). At each time interval, the group coordinator detects the vehicles driving in a certain area, such as a region ahead of one or more traffic lights and speed zones. The group coordinator then determines which vehicles belong in the group, thereby defining the group at 420. For example, the decision may be based on the distance of each vehicle to the first in a series of traffic lights, such as by considering only vehicles that are within 500 meters of the first traffic light as part of the group. Group definition may, for example, exclude any vehicles that plan to exit the shared route before the end of the prediction horizon, or before one of the traffic lights in the prediction horizon. The group may include vehicles which will share at least a portion of the route even if a vehicle plans to exit the route instead. The group may include only those vehicles that can communicate with the group coordinator, or may include both vehicles that can communicate with the group coordinator as well as non-communicating vehicles. For example, in an autonomous driving context, the group may include autonomous as well as driver-controlled vehicles, if desired.

After detecting the vehicles in the route, the group coordinator will obtain individual parameters for vehicles in the group. Vehicles may, for example, communicate 424 desired velocity, any relevant vehicle limitations (such as maximum speed for a vehicle carrying hazardous materials, etc.), various parameters such as vehicle type (light, medium, or heavy truck, passenger vehicle, motorbike, etc.), maximum acceleration or deceleration limits, powertrain architecture (internal combustion engine, hybrid vehicle, battery or fuel cell driven vehicle, etc.), current internal state information (current velocity, position, state of charge of a battery, hybrid power split, etc.) to the coordinator. Some vehicles may not be communicative, as indicated previously, yet still considered part of the group for purposes of the coordinator. For non-communicating vehicles, or for parameters that are not or cannot be communicated, parameters may be observed (such as by use of Lidar, camera, radar, etc.) or inferred (such as by inferring velocity of one vehicle based on prevailing velocity of traffic or one or more nearby vehicles, or simply assuming that a vehicle is planning or targets using a maximum allowed velocity), as indicated at 426.

The coordinator then determines prediction horizon data and sets up the optimization problem, as indicated at 430. For example, the optimization problem may be configured to find optimal manipulated variables $U_j$ to minimize $J_{group}$ from the expression:

$$J_{group} = \Sigma_{j=1 \ldots N} J_j(\Theta_j, X_j, U_j, D_j) \quad \{\text{Equation 1}\}$$

With respect to a set of constraints:

$$C_1(\Theta_1, X_1, U_1, D_1) \leq 0; \quad \{\text{Constraints 1}\}$$

$$C_2(\Theta_2, X_2, U_2, D_2) \leq 0;$$

$$\ldots$$

$$C_N(\Theta_N, X_N, U_N, D_N) \leq 0.$$

Where, in the formulae above, $J_{group}$ represents the overall optimality criterion for the whole group. The index j represents the $j^{th}$ vehicle, N is the number of the vehicles in the group, and $J_j$ is the optimality criterion for the $j^{th}$ vehicle. The optimality criterion is a function of its parameters $\Theta_j$, and state variables $X_j = [x_{j,1}, x_{j,2}, x_{j,3} \ldots x_{j,p}]$, which may be, for example, velocity, distance, state of charge of the battery if applicable and others, of the j-th vehicle. The optimality criterion is also a function of its manipulated variables, $U_j = [u_{j,1}, u_{j,2}, u_{j,3} \ldots u_{j,p}]$, which may be, for example, normalized or absolute powers, accelerations, torques, or any other suitable quantities, and disturbance variables $D_j = [d_{j,1}, d_{j,2}, d_{j,3} \ldots d_{j,p}]$ acting on the $j^{th}$ vehicle, which may be, for example road grade, speed limits, road signs, presence of lead vehicle and others.

It should be noted that the state variables $X_j$, manipulated variables $U_j$ and disturbance variables $D_j$ are configured here as matrices of size $n_{x,j} \times P_j$, $n_{u,j} \times P_j$, and $n_{d,j} \times P_j$, respectively, where $n_{x,j}$ is the number of considered state variables of the $j^{th}$ vehicle, $n_{u,j}$ stands for the number of considered manipulated variables of the $j^{th}$ vehicle, $n_{d,j}$ corresponds to the number of considered disturbance variables for the $j^{th}$ vehicle, and $P_j$ represents the prediction horizon considered for the $j^{th}$ vehicle. The individual optimality criteria $J_j$ are formulated over the corresponding prediction horizons $P_j$ (here, for each vehicle, a different prediction horizon $P_j$ might be considered or a single common prediction horizon might be assumed for all vehicles in the group). Mathematically, criteria $J_j$ are formulated as:

$$J_j = \Sigma_{k=1 \ldots P_j} j_j(\Theta_j, x_{j,k}, u_{j,k}, d_{j,k}) \quad \{\text{Equation 2}\}$$

Regarding the constraints $C_1, C_2, \ldots C_N$, they might be also formulated for each discrete time sample $k=1, \ldots P_j$ separately. Mathematically, this can be summarized as follows:

$$c_{1,1}(\Theta_1, x_{1,1}, u_{1,1}, d_{1,1}) \le 0;$$

$$c_{1,2}(\Theta_1, x_{1,2}, u_{1,2}, d_{1,2}) \le 0;$$

...

$$c_{1,P_1}(\Theta_1, x_{1,P_1}, u_{1,P_1}, d_{1,P_1}) \le 0;$$

$$c_{2,1}(\Theta_2, x_{2,1}, u_{2,1}, d_{2,1}) \le 0;$$

$$c_{2,2}(\Theta_2, x_{2,2}, u_{2,2}, d_{2,2}) \le 0;$$

...

$$c_{2,P_2}(\Theta_2, x_{2,P_2}, u_{2,P_2}, d_{2,P_2}) \le 0;$$

...

$$c_{N,1}(\Theta_N, x_{N,1}, u_{N,1}, d_{N,1}) \le 0;$$

$$c_{N,2}(\Theta_N, x_{N,2}, u_{N,2}, d_{N,2}) \le 0;$$

...

$$c_{N,P_N}(\Theta_N, x_{N,P_N}, u_{N,P_N}, d_{N,P_N}) \le 0.$$

{Constraints 2}

Using, in an example, the above configuration/inputs, the coordinator then can solve the optimization task as shown at 432. Step 432 may be performed, for example, by use of any suitable optimization algorithm (such as, but not limited to, MPC or other function minimizer, for example). The coordinator then communicates one or more of control data or optimized target data to the group, as indicated at 434. For example, the coordinator can distribute the manipulated variables as calculated in the optimized solution by communicating manipulated variable matrix $U_1$ to the $1^{st}$ vehicle, $U_2$ to the $2^{nd}$ vehicle, and so forth. This approach would distribute a general control solution to each vehicle from the coordinator. In other examples, a subset of the control solution trajectory/vector, such as the first few samples or, in one example, only the first samples of each control solution may be communicated (so $u_{1,1}$ to the $1^{st}$ vehicle, $u_{2,1}$ to the $2^{nd}$ vehicle, and so forth). As an alternative, the coordinator may communicate a set of optimized state trajectories (such as velocity, state of charge, or any other applicable state trajectory) to the vehicles in the group, that is, $X_j$, or a subset of the trajectory, such as the first samples thereof ($x_{1,1}$, $x_{2,1}$, etc.), or a plurality of initial samples. The vehicles in the group that receive a state trajectory or one or more samples thereof can treat the received state trajectory information as a reference variable for use by the on-board controller of each such vehicle. In some examples, this approach may provide greater workability insofar as individual vehicles can ensure reference state tracking using their own on-board controllers, rather than relying on other vehicles to provide input control variables.

The group member vehicles then implement a control solution, as indicated at 436. In some examples, the group member vehicles may operate according to the control solution calculated by the coordinator, such as implementing an entirety of the $U_j$ control solution. In other examples, the group member vehicles may implement the first one or first ones of the communicated control solution ($u_{1,1}$, $u_{2,1}$, etc.), and may then calculate a remaining control solution over a prediction horizon independent of the controller. In still other examples, the state trajectory, or a portion thereof, that is received by a given vehicle of the group is implemented by an on-board controller using, for example, one or more setpoint control algorithms or an optimized or predictive control solution.

The method, or portions thereof, may be repeated at an interval which may be set as desired and which may vary from one block to another. For example, the entire method may be repeated at a single sampling interval, where the sampling interval is the one used by the coordinator when it calculates the optimized solution through the prediction horizon. Alternatively, the repetition interval may be longer than that used in the control process for each individual vehicle. In other examples, the step of defining the group 420 may be repeated at a lower frequency; for example, line 440 may indicate repetition at a 1 second interval, and line 442 indicates repetition at a 10 second interval.

In still further examples, the coordinator may obtain individual vehicle information at block 420, and determines what is distributed to each vehicle during block 434 according to the particular capabilities of the individual vehicles in the group. For example, if some vehicles operate using a predictive controller that implements, for example, MPC, then a state trajectory or portion thereof can be communicated to such vehicles. If other vehicles in the group have a different controller type, such as one lacking predictive control capabilities, those other vehicles may receive a control solution or portion thereof to be directly implemented.

The coordinator may also be equipped to determine, when calculating the optimized solution, which vehicles in the group are necessary to the success of other vehicles in the group obtaining an optimized solution. For example, if a group has five vehicles, the $3^{rd}$ vehicle may be in front of the $4^{th}$ vehicle, and it may be necessary for the third vehicle to strictly follow an optimized velocity profile in order to allow the $4^{th}$ vehicle to achieve its own optimized solution. Assume further that the $2^{nd}$ vehicle is ahead of the $3^{rd}$ and $4^{th}$ vehicles by a relatively larger distance and that the $2^{nd}$ vehicle is therefore not positioned to impact the optimized solution for the $3^{rd}$ and $4^{th}$ vehicles. The coordinator in this scenario may communicate a control solution to the $3^{rd}$ vehicle (and possibly also to the $4^{th}$ vehicle), while communicating a state trajectory to the $2^{nd}$ vehicle. Thus, the coordinator may communicate different levels of control to different vehicles in the group by identifying vehicles in the group that are likely to impact optimization of other vehicles.

Figure 11:
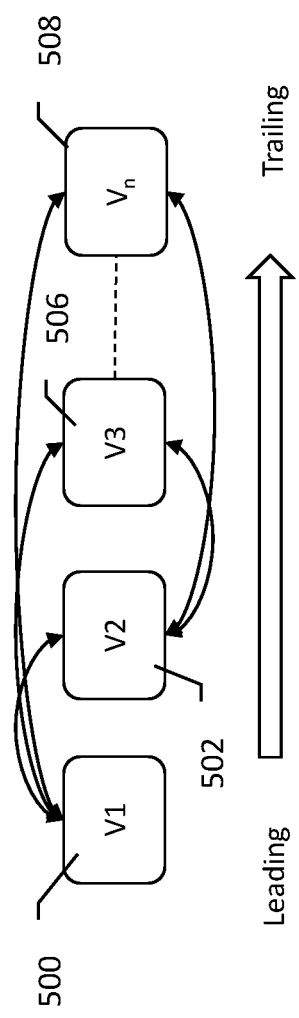
FIG. 11 shows an illustrative system with vehicle to vehicle communication.

FIG. 11 shows an illustrative system with vehicle to vehicle communication. In this example, each vehicle V1 500, V2 502, V3 506 and so forth to vehicle Vn 508 can communicate directly with one another. In this system, each of the vehicles has its own on-board optimizer that will optimize explicitly the overall behavior for all the vehicles in the group, or within a limited subset of the group, as the case may be. Alternatively, some but not all vehicles may have an internal optimizer, and other vehicles may receive instructions or targets from other vehicles in the group. In some examples, a full group optimizer procedure may be performed by each vehicle, where the performance of all group members is calculated by the individual vehicles. In other examples, the performance of only selected group members is optimized by the individual vehicles that perform the optimization.

Figure 12:
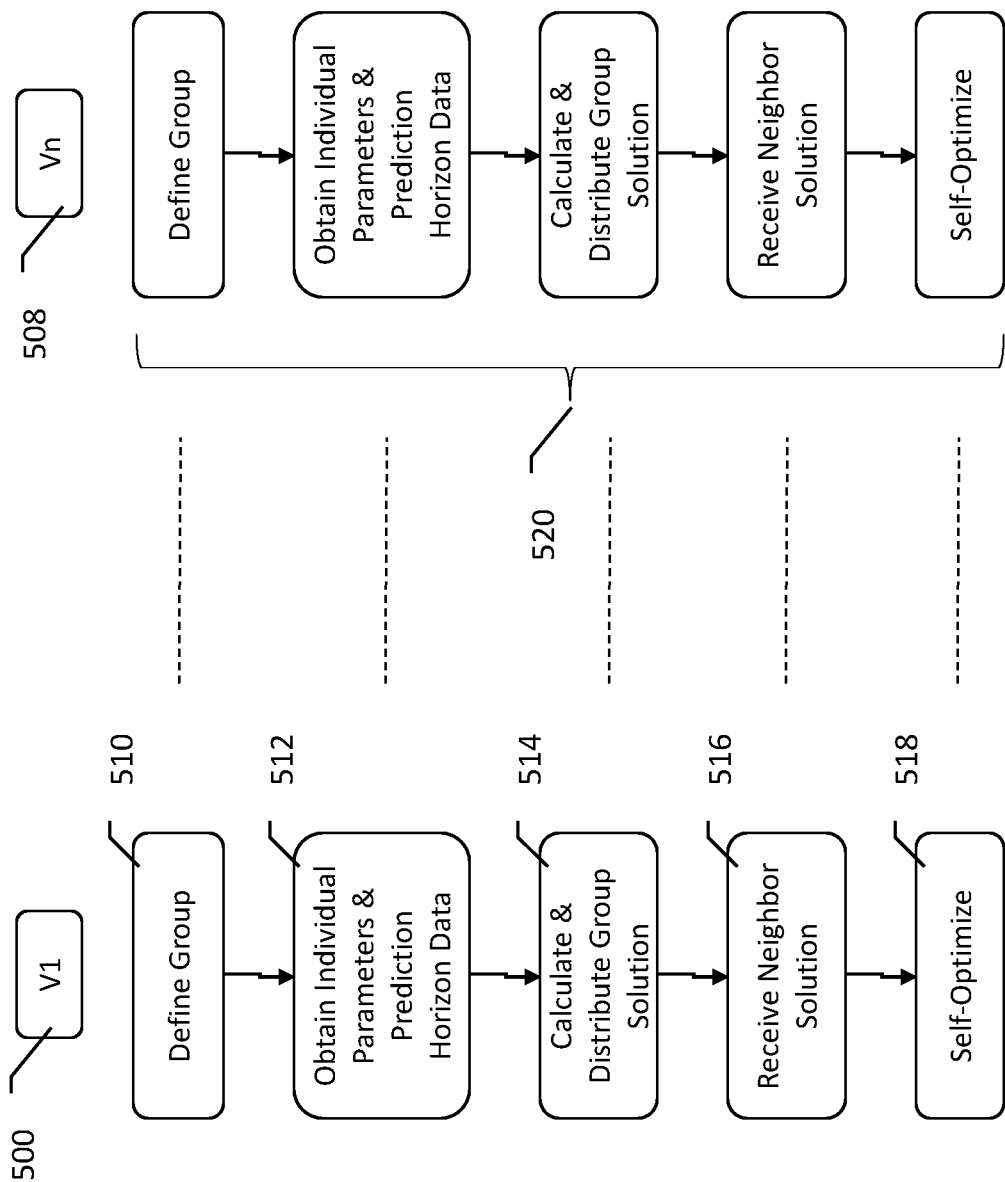
FIGS. 12-14 are block diagrams illustrative process flow in each of a set of vehicles.

FIG. 12 illustrates in a block diagram a process flow for the vehicle grouping of FIG. 11. First, each vehicle defines its own group, as indicated at 510. Group definition may rely on one or more of proximity, route selection, and vehicle capability, for example. That is, for example, vehicles within a defined proximity of V1 500 may be deemed eligible to be in the group at 510, and then only those vehicles travelling on the same route as V1 and/or those vehicles that are capable of communication with other vehicles (directly or through an intermediary system) are deemed group members. Group definition may occur at each discrete sample time (such as every 0.5, 1, or 2 seconds, or more or less frequently) to be used in the analysis, though as noted above group definition may occur at a different sampling rate (less frequently, for example) than that used by the overall optimization. Vehicle to vehicle communication may be exploited, and the vehicles in the vicinity may broadcast for example, their own intended trajectory to other vehicles, allowing the vehicles to achieve consensus as to which vehicles belong in the group as that term is defined for each vehicle in the group. Alternatively, each individual ego vehicle may have its own definition of the group.

The decision whether to include certain vehicles in another vehicles group may or may not be based on the relative distance between the vehicles (such as, for example and without limitation, within 20, 40, 60 or more meters). Relative distance may vary with prevailing traffic speed or local speed limits, as desired. Relative distance can be evaluated at a specific point in time, or may be evaluated throughout the prediction horizon (which may last seconds, tens of seconds, or even minutes). That is, a vehicle which is not within the specified relative distance for a select ego vehicle at the time of evaluation may still be treated as belonging to the group if it is expected that the vehicle will be within the specified relative distance at another (later) point in time within the prediction horizon. Conversely, a vehicle that is within the relative distance which is expected to no longer be within the relative distance at some future time (due to following a different route, or having different speed or other constraints, or due to a determination that the vehicle will not pass a traffic light within the same go period as the ego vehicle) may be excluded from the group. In an example having eight vehicles in proximity to one another the groups may vary as shown here, using an 80 meter range:

Lead vehicle V1 may consider following vehicles V2, V3, V4 and V5 to be within its group as each are within 80 meters of V1 throughout the prediction horizon;

First following vehicle V2 may consider lead vehicle V1 and following vehicles V3, V4, V5 and V7 to be within its group, by assessing the trailing vehicle V6 will drop back and no longer be within the 80 meter range later during the prediction horizon, while V7 is not expected to drop out Skipping ahead, the sixth following vehicle V6 may consider V3, V4, V5, V7 and V8 to be within its group, while V1 and V2 are not as those vehicles will pull ahead outside of the 80 meter range during the prediction horizon.

That is, the group definition may vary from one vehicle to another in this example. Other approaches to group definition may be used.

Next, each ego vehicle obtains parameters and prediction horizon data for those vehicles in its group, as indicated at 512. Various parameters can be communicated between the vehicles in the group, such as desired velocity, basic vehicle properties, vehicle type, maximum limits for acceleration, deceleration, velocity, and current internal states. Some parameters (including route plan, maximum or minimum velocity, for example) may have already been obtained when defining the group in block 510. Parameters may be communicated amongst all members of each of the groups defined by each vehicle, as desired. For example, the three groups noted above (having V1, V2 and V6 as ego vehicles) may each have data exchange amongst the members thereof.

Data may be transferred directly between individual vehicles, or through an intermediary network or vehicle. For example, V1 may communicate its parameters to V2 and V3, and V3 may communicate V1's parameters to V4 and V5. Any suitable pattern or and/or data hopping arrangement may be used, as desired. For example, V1 may be aware of its membership in groups having V2, V3, V4 and V5 as ego vehicles. V1 may communicate its parameters to V2, with an indication that the message directed to V2 should be passed on by V2 to V3, and by V3 to V4, and so forth, until all ego vehicles in the overall system have received the parameters relevant to each member of its group.

For vehicles that fail to communicate successfully, or for vehicles not equipped for communication, the ego vehicle for the relevant group may estimate or infer parameters to fill in the missing data. For example, a radar system may be used to estimate the velocity of a non-communicating vehicle, or a visual recognition system may determine vehicle parameters by, for example, determining the type of vehicle or other characteristics by visual observation of the vehicle shape, by referencing a license plate database, or by obtaining data through visual markings on the non-communicating vehicle. For example, vehicle type may be visually observed, and further data can be obtained by reference to visual markings, and vehicle parameters can then be estimated or inferred. As a specific example, visual observation may allow vehicle type to be determined (a tractor-trailer having a tank-shaped trailer), and additional visual indicia may be obtained (an observed Hazmat placard, for example), allowing the ego vehicle or another vehicle in the group to characterize the non-communicating vehicle as a fuel carrying tanker truck, from which the ego vehicle can then infer that the vehicle is operating with limited maximum velocity and/or capability for acceleration and deceleration.

Each vehicle then creates its own optimization task, and calculates and distributes a group solution, as indicated at 514. The optimization task for each vehicle may illustratively take the form as shown in Equation 1, above, using Constraints 1, also shown above, with the aim to find the optimal manipulated variables $U_j$ minimizing $J_{group}$ as expressed in Equation 1. In this example, each ego vehicle formulates the task for its own group. As a result, the formulations and the quantity of vehicles within the group N may vary from one ego vehicle to another, as the size of each group may not be the same across a set of ego vehicles. For each ego vehicle, then, the variables used in Equation 1 and Constraints 1 may be unique. Moreover, the prediction horizons for each ego vehicle and corresponding group may also vary. For example, using the above set of three groups (more may be present, noting also that V6 in the example is deemed by V2 as likely to drop back and therefore not part of the group for ego vehicle V2, though V7 is deemed as likely to stay within the group for V2):

V1 incorporates into its cost function vehicles V1, V2, V3, V4 and V5

V1 considers prediction horizons $P_{1,1}$ for itself, $P_{1,2}$ for V2, $P_{1,3}$ for V3, $P_{1,4}$ for V4, and $P_{1,5}$ for V5

V1 considers optimized variables $U_{1,1}$ for itself, $U_{1,2}$ for V2, $U_{1,3}$ for V3, $U_{1,4}$ for V4, and $U_{1,5}$ for V5

V2 incorporates into its cost function vehicles V1, V2, V3, V4, V5 and V7

V2 considers prediction horizons $P_{2,1}$ for V1, $P_{2,2}$ for itself, $P_{2,3}$ for V3, $P_{1,4}$ for V4, $P_{2,5}$ for V5, and $P_{2,7}$ for V7

V2 considers optimized variables $U_{2,1}$ for V1, $U_{2,2}$ for itself, $U_{2,3}$ for V3, $U_{2,4}$ for V4, $U_{2,5}$ for V5, and $U_{2,7}$ for V7

Skipping ahead, V6 incorporates into its cost function vehicles V3, V4, V5, V6 and V7

V6 considers prediction horizons $P_{6,3}$ for V3, $P_{6,4}$ for V4, $P_{6,5}$ for V5, $P_{6,6}$ for itself, and $P_{6,7}$ for V7

V6 considers optimized variables $U_{6,3}$ for V3, $U_{6,4}$ for V4, $U_{6,5}$ for V5, $U_{6,6}$ for itself, and $U_{6,7}$ for V7

The fact that the same process is performed for each of the N vehicles is illustrated at 508, where all the same process steps performed by V1 are repeated as indicated at 520. The symbols used throughout this example carry the same meaning as above in the first discussion of Equation 1 and Constraints 1.

Next, the vehicles solve these optimization tasks, with each ego vehicle performing its own optimization relative to the group it has defined. The ego vehicle for each group, in an example, communicates the results of the optimization to the surrounding vehicles ("distribute", as indicated at 514). As before, a complete profile may be communicated, or only the first one or first several discrete time samples may be communicated.

Each ego vehicle will thus receive one or more neighbor solutions, with each solution corresponding to a group the ego vehicle belongs to, as indicated at 516. Next, each ego vehicle calculates its own self-optimization, as indicated at 518. In an example, a weighted average of the sample, samples, profiles, or samples within profiles (collectively and individually, the "elements") that have been received by the ego vehicle, as well as the elements that the ego vehicle itself has calculated. State trajectories may be communicated and reconfigured via weighted averaging, or controlled variables may be communicated and reconfigured via weighted averaging in different examples. The weights to be used can be selected in various forms:

Each of the self-generated and received elements may have the same weight;

The self-generated element may have a greater weight than any received element;

The self-generated element may have zero weight, and the remaining elements each given the same weight;

Received elements may be given zero weight, which would make block 516 unnecessary;

Weight applied to a given element may decrease with increasing distance from the ego vehicle to the source of the given element The procedure would then be repeated at the next sampling interval, starting either from block 510 (if the group is newly defined at each sampling interval) or 512 (if the group definition is kept constant for two or more sample intervals).

In another example, vehicles may be configured to perform a method generally as in FIG. 12, but can switch instead to a centralized control approach as in FIG. 10 by first analyzing group membership. In an example, when the groups are defined by each vehicle using step 510, and individual parameters are shared at 512, the group members may determine whether each vehicle in the group has defined an identical group. For example, if there are four group members, vehicles Vx, Vy, Vz and Vw, and each of the vehicles in the group has defined for itself the same group set (consisting of each of Vx, Vy, Vz and Vw), then the group may designate one of the vehicles as a central controller for the group, and the process would switch from that of FIG. 12 to that of FIG. 10. For example the most trailing vehicle in the group may be designated as the central controller, since actions taken by the vehicles in front of the trailing vehicle can affect the trailing vehicle adversely as shown in previous examples. On the other hand, when the different vehicles define different groupings, the method of FIG. 12 may serve the overall optimization better. As a result, a method may take the form of having a set of vehicles each identify a set of vehicles meeting a proximity rule as belonging to that vehicles group for control purposes. Next, the set of vehicles exchanges group identification, and determines if or whether each vehicle in the set of vehicles has defined the same group. If each vehicle in the set of vehicles defines the same group, then one of the vehicles in the set of vehicles is designated as the controller for the set of vehicles, and the vehicle designated as the controller calculates and distributes a control solution for each of the set of vehicles. Finally, each of the set of vehicles uses the distributed control solution to determine one or more of speed, acceleration and/or deceleration steps to implement while travelling on a road. The group may designate the most rearward or trailing vehicle as the controller for the group.

In yet another example, building off of the Example of FIG. 12, the group optimization problem may be distributed across the vehicles. Each vehicle calculates a self-optimized solution over its own full prediction horizon. Due to restricted computation time each optimized solution may itself be suboptimal. Permissible subintervals of acceptable accelerations and decelerations may be characterized for each individual vehicle to optimize. After each optimizing vehicle finishes its subset of the calculations, the vehicles each communicate a calculated solution. Out of these solutions calculated by individual vehicles, the best one is chosen and applied. In one illustration, a group coordinator (FIG. 9, at 400) may task vehicles in the group (V1 to Vn in FIG. 9) with subsegments of the optimization problem, receives each subsegment solution, and then assimilates and distributes an overall optimized solution back to the vehicles, where each vehicle operates more or less as shown in FIG. 12 to analyze an assigned subsegment. This approach may decrease the computational requirements of each vehicle needed to find the optimal solution for the overall group.

Figure 13:
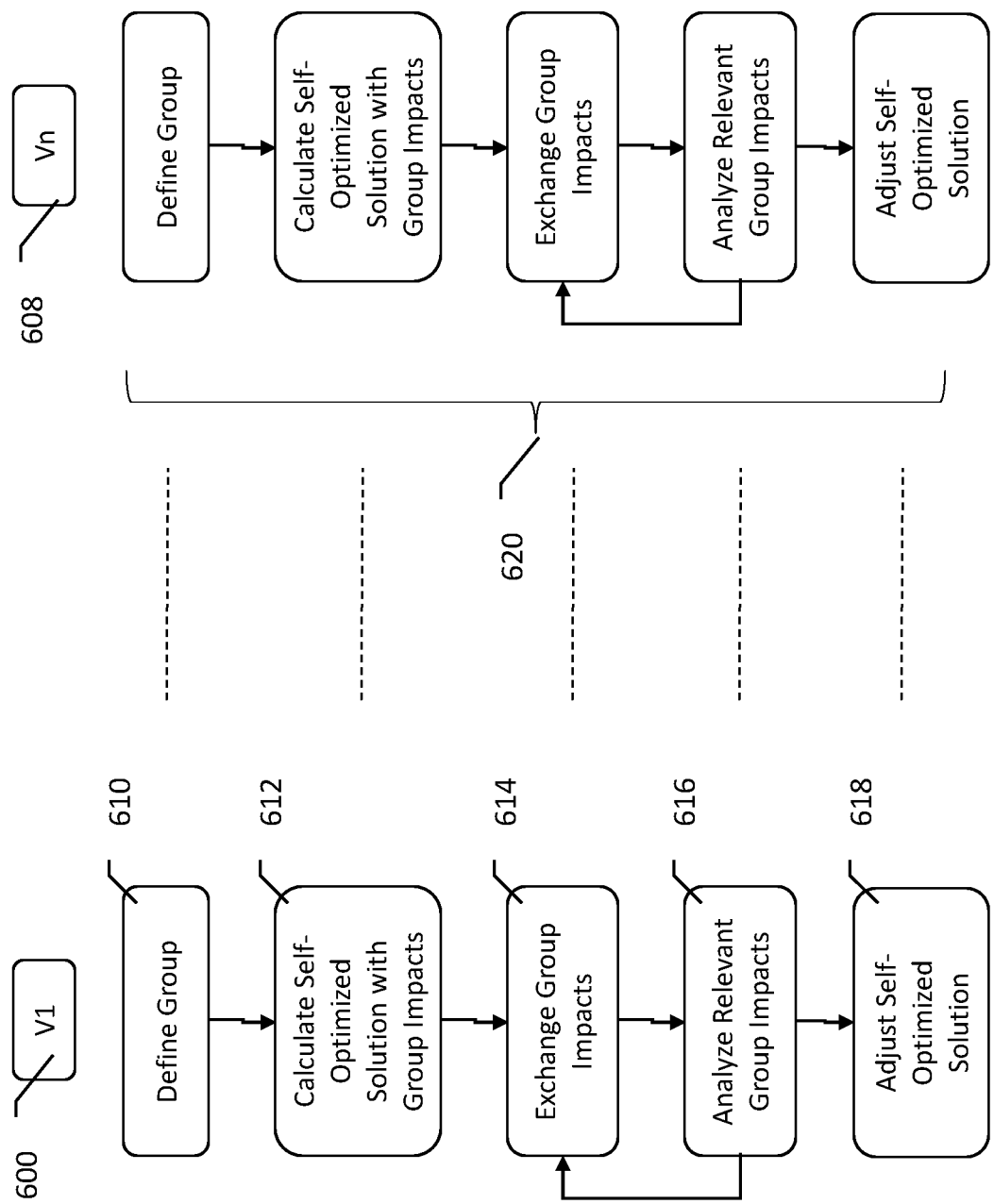

FIG. 13 shows another example. Here, each vehicle will again perform its own initial optimization, as with FIG. 12, by defining a group at 610 and calculating a self-optimized solution at 612. A difference here is that step 612, calculating the optimized solution, also calculates impacts that the rest of the group may have on the optimized solution, or dependencies within the group. That is, to limit "selfish" optimization, the ego vehicle communicates the needed trajectory that its optimized path requires of any other vehicles in the group.

Within block 612, for example, the ego vehicle calculates its self-optimized solution, while also determining any potential impacts or requirements the ego vehicle has of other vehicles. For example, referring to FIG. 4, if the ego vehicle is the vehicle travelling along line 82, it can calculate an optimized solution in which each of the traffic lights at 50, 52, and 54 are passed as shown by line 82 in FIG. 4. During the group definition step 610 (FIG. 13), the ego vehicle will become aware of the presence of another vehicle (the "leading vehicle") that is ahead of the ego vehicle, shown in FIG. 4 as travelling along line 80. To ensure that the ego vehicle can maintain the velocity needed to travel along line 82, it may use, for example, a predefined minimum following distance and its knowledge of where the leading vehicle is at the time of group definition to calculate a vehicle trajectory as shown at 80, noting as well that the leading vehicle will need to travel at least as fast as line 80. The leading vehicle may go faster if that is the optimal solution for the leading vehicle, but the aim for the ego vehicle (again, the ego vehicle here would be the one that calculates an optimized trajectory as shown at 82) is to ensure that the leading vehicle will allow the ego vehicle to travel as shown at 82.

In some examples, a larger collection of vehicles may be analyzed by the ego vehicle to make decisions. For example, it may be that a group of vehicles cannot all pass through a single go period of a given traffic light. One or more vehicles in the group, or a group controller separate from any of the vehicles, may analyze how the group can travel together to minimize fuel consumption, for example, across the entire group. As a result, one or more lead vehicles may pass a traffic light during a first go period, and one or more trailing vehicles may pass the same traffic light during a second go period after the first go period. Optimization of the group may be performed to ensure that the last vehicle of the trailing vehicles passes the traffic light during the second go period, rather than having to wait for a third go period after the second go period.

The ego vehicle will exchange group impacts with other vehicles in the group, as indicated at 614. The leading vehicle, which as noted is performing the same procedure as the ego vehicle, will receive a message as part of block 614 from the ego vehicle indicating a minimum velocity that the ego vehicle needs from the leading vehicle to achieve its optimized path. The leading vehicle then analyzes the group impacts 616 that derive from any received information from block 614. For example, the leading vehicle will analyze whether it has any constraints on its own behavior that would prevent it fulfilling the request generated by the ego vehicle. Constraints may include, for example, a maximum velocity that the leading vehicle may use, maximum energy consumption, uncomfortable acceleration, etc.

If the leading vehicle can accommodate the request from the ego vehicle, it will communicate acceptance of the request as part of a cycling approach to blocks 614, 616 and, if not, rejection of the request is communicated. If the ego vehicle models more than one leading vehicle, the process can be repeated for each leading vehicle. Communicated acceptance of the request allows the requesting vehicle to determine an optimized control solution with reduced uncertainty as to whether the optimized solution can in fact be implemented. In addition, acceptance of the request means that the leading vehicle will adjust its performance to prevent degradation of the requesting (trailing) vehicle's travel metrics or performance, such as by allowing the requesting vehicle to pass a traffic signal in a go period, rather than having to slow down and wait for a subsequent go period.

Any rejection of a request in the process at 614, 616 is communicated to the requesting vehicle, which then will move back to step 612 and recalculate its optimized solution, using the rejection as a new constraint on the optimization procedure. The process can reduce degradation of travel metrics or performance in the requesting vehicle by enabling it to optimize performance with the additional constraint, rather than attempting a control solution which cannot be accommodated by one or more leading vehicles.

Group impacts can then be exchanged again, at block 614, and then analyzed at block 616, and either accepted or rejected. For example, using the example of FIG. 8, if the trailing vehicle is travelling at 350 initially, behind a leading vehicle shown at 340, the trailing vehicle may request that the leading vehicle accelerate to travel as shown by broken line 344. However, if the leading vehicle determines that broken line 344 would violate a constraint of the leading vehicle, the leading vehicle will communicate rejection of the request to the trailing vehicle, and continue along line 342. In another example, the leading vehicle may be configured to determine that the request would degrade performance of the leading vehicle, such as by reducing an optimized metric (such as vehicle wear cost, fuel efficiency, etc.) by an amount that exceeds a predetermine threshold (a percentage wear, a percentage or absolute value of efficiency, etc.), and, if so, the leading vehicle may communicate rejection of the request to the trailing vehicle. That is, acceptance or rejection of a requested change may be due to constraint violation in some examples, and/or may be due to performance degradation/cost in other examples, or due to either or both in still further examples.

With the request rejected by the leading vehicle, the trailing vehicle will select optimum parameters for travel along line 352, rather than attempting to traverse along path 354. That may include, for example, some slowing even earlier, in zone 332 before traffic signal 322, for a more gradual deceleration. In an example, the trailing vehicle would first communicate parameters related to the trajectory shown at 354, and would then communicate new parameters to the group after adjusting for the leading vehicle's rejection of the requested adjustment.

In some examples, such as with multiple vehicles influencing each other, multiple communications may take place before the requirement/request of a particular vehicle is accepted or declined. For example, given four vehicles (V1, V2, V3, V4), if one vehicle, V4, requests a speed increase of vehicle V3, that request may necessitate V3 requesting a speed increase for V2, and V2 may need to request a speed increase by V1. Thus:

- V4 sends a request for speed increase (for example, "+8 kph") to V3, and waits for response
- V3 receives the request and determines V4's request can only be met if V2 also accelerates (but by a different amount), so V3 sends a request for speed increase, "+4 kph" to V2
- V2 then analyzes whether it can meet the request of V3; supposing here that V2 determines that it does not need to request a change of V1, no further communication to V1 is required.
- If V2 can meet the request from V3:
  - V2 communicates acceptance to V3 and incorporates the requested change into its cost function;
  - V3 receives the acceptance from V2, incorporates the requested change into its cost function, and communicates acceptance to V4; and
  - V4 receives the acceptance from V3 and updates its lead vehicle information accordingly
- On the other hand, if V2 cannot meet the request from V3:
  - V2 communicates rejection to V3 and does not change its cost function;
  - V3 receives the rejection from V2, does not change its cost function, and communicates rejection to V4; and
  - V4 receives the rejection from V3 and treats the rejection as a constraint, or adjusts its cost function accordingly After all the communication is completed, the vehicles optimize with respect to their own cost functions and applicable constraints, as indicated at 618. The costs functions may now be augmented with additional terms related to any requests of the other vehicles. For example, for each vehicle, the new cost function may be as shown in Equation 3:

$$J_{ego}=J_{self}(\Theta_{ego},X_{ego},U_{ego},D_{ego})+\Sigma_{j=1\ldots N}R_j(\Theta_j,X_j,U_j,D_j)$$ {Equation 3}

Where the $J_{self}$ function corresponds to a cost criterion containing only terms that are related to the ego vehicles performance, such as time of arrival, energy consumption, etc. The second term represents the requirements from all the other vehicles in the group. Also in Equation 3, the subscripts "Ego" and "j" are used to distinguish between the variables that are relevant from the ego vehicles point of view (ego) and the other vehicles point of view (j). If the ego vehicle accepts a request from another vehicle, then the cost function would be formulated to so that satisfaction of the accepted request is guaranteed, such as by applying a high weight for such received and accepted requirements.

In other formulations, the accepted requirements from other vehicles may be omitted from the cost functions, and are instead treated as constraints on the vehicle operation. That is, the cost function may be optimized within bounds that are constrained by the accepted requests from other vehicles, rather than calculating an optimization that heavily weights the accepted requests.

After the optimization, the vehicles may communicate their own predicted state profiles to other vehicles in the group and/or to the neighboring vehicles, where the predicted state information may be used as initial information about the environment. As shown in the above example having V4, V3, V2 and V1, the requests that are communicated from one vehicle to another may only be for the adjacent vehicle in some examples, where each adjacent vehicle then determines an impact on a subsequent adjacent vehicle. It may be that an additive function results:

V4 determines that its optimal solution requires a change of velocity for V3;

V3, before communicating with V4, determines that its optimal solution requires a minimum velocity from V2 as well;

V3 may wait to hear from V4 before communicating its needed change from V2 and, upon receipt, recalculates the change needed of V2

Alternatively, V3 may wait to calculate its own optimization until after it hears from V4, and then integrates the request from V4 to its own initial optimization As can be seen, there are potentially several ways for each vehicle to optimize and re-optimize what it is to do. Because of the potential for repeated recalculation, in some examples, a maximum group size rule may be enforced to ensure that all calculations and communications can be accomplished within a given sampling interval. For example, no more than 8, or 16, or 24 vehicles may be considered in a group. In some examples, a centralized control and distributed control capability may be provided to the individual vehicles, and depending on the number of vehicles in a given system, a central control (for more vehicles) may be used rather than the distributed control approach.

In addition, in some examples, group coordination may occur at a longer sampling interval than the internal optimization for each vehicle. There may be nested tiers of optimization in any given vehicle, such as, for example, a lowest tier using a first sampling interval and time horizon, control is performed over the valves and actuators within an engine, using a set of control signals or targets (engine speed, torque, etc.) from a higher-level controller. At a second sampling period, the higher-level controller may engage in vehicle optimization to ensure that a speed/velocity trajectory is met, using the controlled variables and/or states that are determined from a top-level controller that engages in the group coordination effort.

Figure 14:
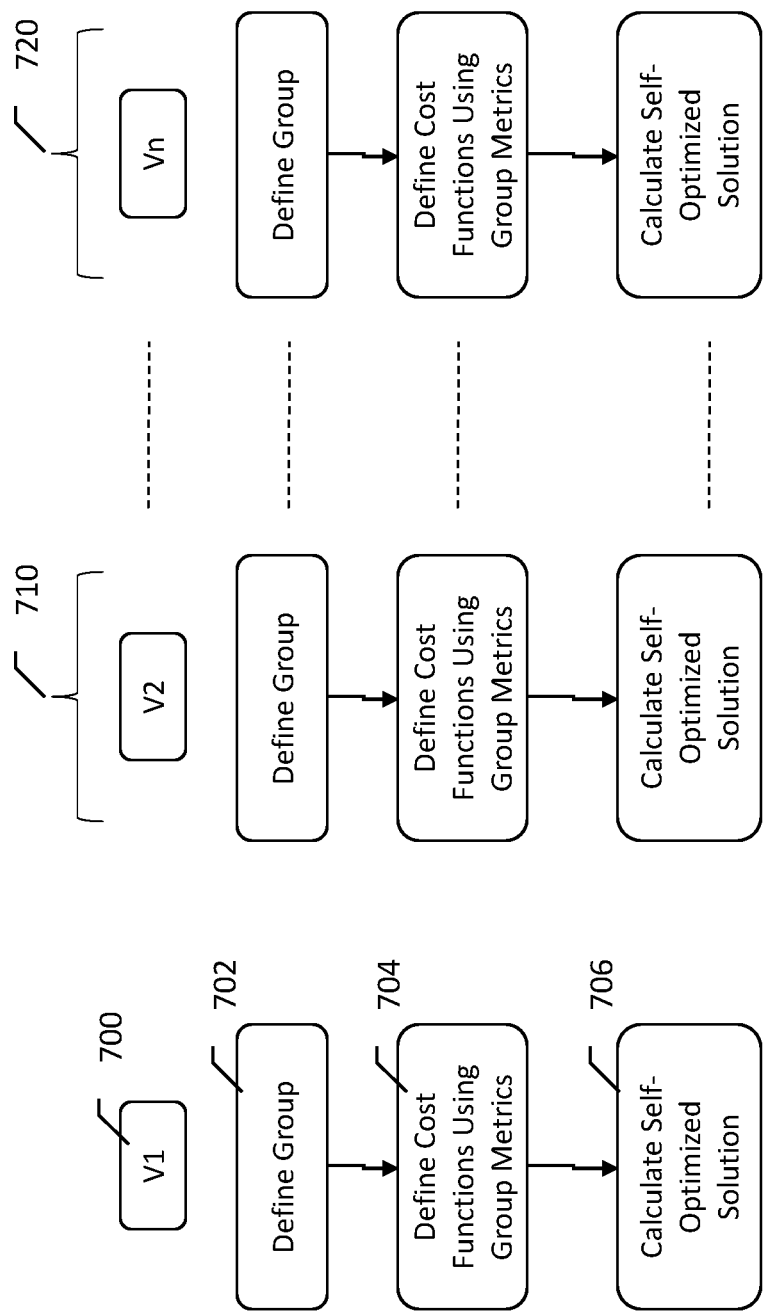

FIG. 14 shows another example. In this example, the individual vehicles have on-board optimizers, in which the optimizer includes terms for other vehicles present either in a defined group or simply in the vicinity of the ego vehicle. Each vehicle can use a model of neighboring vehicle performance/actions. Such neighboring vehicle models may, for example, describe the behavior of the neighboring vehicles as functions of environmental variables including, for example and without limitation, maximum admissible velocity, road grade, road curvature, lead vehicle, etc.

The method begins by defining the group of vehicles to consider, as indicated at 702. Next, cost functions using group metrics are defined. Each vehicle may use a different set of metrics within the group (assuming the same group is defined for each vehicle). For example, given a set of four vehicles V1, V2, V3, and V4, V1 may use the following models:

For itself, a model describing V1's own dynamics as a function of V1's manipulated variables $U_1$;

A model describing dynamics of V2 as a function of environmental variables (speed limit, road curvature, grade, traffic lights), V2 parameters (maximum acceleration/deceleration, etc.) and behavior (such as V2 drives at maximum allowed speed whenever possible and keeps a certain safe distance from V1);

A model describing dynamics of V3 as a function of environmental variables (speed limit, road curvature, grade, traffic lights), V3 parameters (maximum acceleration/deceleration, etc.) and behavior (such as V3 drives at maximum allowed speed whenever possible and keeps a certain safe distance from V2); and A model describing dynamics of V4 as a function of environmental variables (speed limit, road curvature, grade, traffic lights), V4 parameters (maximum acceleration/deceleration, etc.) and behavior (such as V4 drives at maximum allowed speed whenever possible and keeps a certain safe distance from V3).

The modelled dynamics of V2, as just formulated for V1's optimization, are at least in part a function of the manipulated variables $U_1$ of V1 due to the combination of maximum speed and safe distance criterion. That is, it would be presumed by this formulation that whenever V1 is travelling below the maximum allowed speed, V2 is catching up to V1 until the safe distance criterion is met. Likewise, the modelled dynamics of the remaining vehicles, V3 and V4 are also expressed by V1 as a function of $U_1$. Even if the V1 cost function contains terms related to V2, V3 and V4 objectives (time of arrival, energy consumption, constraint satisfaction), in the end each of these other vehicle objectives can be expressed by V1 as a function of $U_1$ only.

The models of neighboring vehicle behavior may be used not only for follower vehicles but also for leading vehicles. For example, a vehicle may be modelled as maintaining a current speed (which may be below the maximum admissible speed) if its follower vehicle is not detected within a chosen distance. If the follower vehicle is detected within the chosen distance, the lead vehicle may react by increasing its current speed. Further, the model of the vehicle can be described as well as a function of environmental variables, its own parameters, and the behavior of the following vehicle. Repeating the above sequence for V3 then:

For itself, a model describing its own dynamics as a function of its own manipulated variables $U_3$;

A model describing dynamics of V1 as a function of environmental variables (speed limit, road curvature, grade, traffic lights), V1 parameters (maximum acceleration/deceleration, etc.) and behavior (such as V1 maintains its current speed whenever V2 trails by at least a chosen distance, and increases its velocity up to the maximum limit as a function of proximity to V2);

A model describing dynamics of V2 as a function of environmental variables (speed limit, road curvature, grade, traffic lights), V2 parameters (maximum acceleration/deceleration, etc.) and behavior (such as V2 maintains its current speed whenever V3 trails by at least a chosen distance, and increases its velocity up to the maximum limit as a function of proximity to V3); and A model describing dynamics of V4 as a function of environmental variables (speed limit, road curvature, grade, traffic lights), V4 own parameters (maximum acceleration/deceleration, etc.) and behavior (such as V4 drives at maximum allowed speed whenever possible and keeps a certain safe distance from V3).

As with other examples any factors that can further influence vehicle behavior may also be added to the models, such as any road signs, traffic lights, curvature, grade, advisory speed limits, weather conditions, etc. As may be noted, in the above examples, the behavior variables of the surrounding vehicles (or other group vehicles, depending on whether a group is defined/declared) are used to formulate a solution for the ego vehicle. The metrics for V2 would be similar to those of V3, though V2 would now be the ego vehicle and V3 would be treated similar to V4. Metrics for V4 would treat each of V1, V2 and V3 as lead vehicles.

The approach here simplifies the neighboring vehicle behavior in a way that allows the manipulated variables of the ego vehicle to define all neighboring vehicle behavior. Using this approach, the cost function for each vehicle can be as follows:

$$J_{ego} = J_{selfish}(\Theta_{ego}, X_{ego}, U_{ego}, D_{ego}) + \Sigma_{j=1 \ldots N} J_j(\Theta_j, X_j(\Theta_j, X_{ego}, U_{ego}, D_j), D_j) \quad \{\text{Equation 4}\}$$

As can be seen, the optimization task for each vehicle can be solved by optimizing the ego vehicles own manipulated variables as indicated at 706. Each of the other vehicles performs the same method, as indicated at 710, 720.

For this variant, communication between the vehicles is useful, but may not be mandatory. If communication between vehicles is established, parameters and targets may be exchanged, as desired. If no communication is established, the individual vehicles may use default parameters or settings for the neighboring vehicles. For some situations, vehicles may communicate current state variables (speed, relative distance, etc.) to other vehicles. In addition or alternatively, vehicles may gather such information form on-board sensors such as radar, lidar, camera, etc.

The preceding examples generally focus on how a trailing vehicle may request a change in performance by a leading vehicle. Referring back to FIG. 11, this suggests that, for example, V1 would receive requests from any of V2 to Vn, which are trailing vehicles, so long as the trailing vehicle is in the same group as V1. The procedure may also be reversed. In some circumstances, a lead vehicle may communicate its own performance constraints to trailing vehicles. For example, where there is an incline, a heavy vehicle may have to adopt a maximum speed that relates more to its own load and the grade of the incline than to any speed limit or other characteristic. For example, some vehicles need to maintain a specific gear and engine speed to prevent stalling when going uphill, and/or may need to use a lower gear to limit maximum speed by relying on engine braking when going downhill. The combination of gear and engine speed will result in a reduced maximum speed than may otherwise apply to the vehicle. If a lead vehicle determines that it needs to adopt a speed that is mandated by road grade/incline, the lead vehicle can communicate this information to other vehicles in the group as a constraint on its speed, and the other vehicles may incorporate this information into their own planning. Other factors, such as weather conditions, ice, wet roadway, and road curvature may also play a role in such a calculation.

Some further examples may be operable as a driver advisory system, rather than an autonomous vehicle system. In such a system, the vehicle controller may perform any of the above methods to determine an optimized traffic signal strategy, and communicates to a driver controlling the vehicle recommended travel controls. For example, recommended speed may be displayed to the human driver who maintains full vehicle control. The driver may choose, at his or her option, whether to implement the recommended strategy.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." Moreover, in the claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. A vehicle controller for a first vehicle, comprising one or more sensors for sensing conditions outside of the first vehicle and a transceiver for communicating with an off-board communication system, the vehicle controller configured to:
   determine whether a second vehicle that shares a planned travel path with the first vehicle and is trailing the first vehicle is within a following distance of the first vehicle;
   if the second vehicle is within the following distance:
      adopt a first traffic-light approach method;
      model a second vehicle trajectory for the second vehicle relative to at least one upcoming traffic light in the planned travel path shared by the first vehicle and the second vehicle; and
      calculate a first vehicle trajectory to allow the first vehicle and the second vehicle to pass the at least one upcoming traffic light using a same go-period of the at least one upcoming traffic light; and
   if the second vehicle is not within the following distance, adopt a second traffic-light approach method; wherein the vehicle controller is configured to adopt the first traffic-light approach by performing the following:
   the vehicle controller determines a first velocity profile for passing the at least one upcoming traffic light, the upcoming traffic light having go-periods and no-go periods, such that the upcoming traffic light is passed by the first vehicle during a first go-period;
   the vehicle controller determines whether the first velocity profile would enable the second vehicle to pass the upcoming traffic light during the first go-period and, if so, the vehicle controller implements the first velocity profile to control velocity of the first vehicle to pass the upcoming traffic light during the first go-period; otherwise,
   the vehicle controller determines whether a second velocity profile would enable the second vehicle to pass the upcoming traffic light during the first go-period and either:
      if so, implementing the second velocity profile to control velocity of the first vehicle through the upcoming traffic light;
      if not, implementing the first velocity profile to control the first vehicle through the upcoming traffic light.

2. The vehicle controller of claim 1, wherein:
   the vehicle controller determines the first velocity profile by performing a cost function minimizing routine for the first vehicle itself without considering the second vehicle; and
   the vehicle controller determines the second velocity profile by performing a cost function minimizing routine for the first and second vehicles as a group.

3. The vehicle controller of claim 1, wherein:
   the transceiver is configured for obtaining data indicating when go periods and no-go periods are to occur;
   if the second vehicle is within the following distance, the vehicle controller is configured to communicate with the second vehicle to obtain one or more second vehicle travel parameters; and
   the first traffic-light approach method includes analyzing the second vehicle travel parameters to determine whether the first vehicle and second vehicle can pass the upcoming traffic light during the same go-period of the upcoming traffic light.

4. A vehicle control method operable by a vehicle controller comprising:
   identifying, in a first vehicle controller for a first vehicle, presence of at least one following vehicle that shares as planned travel path with the first vehicle and is trailing the first vehicle within a following distance of the first vehicle;
   modeling, in the first vehicle controller, a following vehicle trajectory for the at least one following vehicle relative to at least one upcoming traffic light in the planned travel path shared by the first vehicle and the at least one following vehicle;
   assessing, in the first vehicle controller, a prediction horizon for the first vehicle and identifying a traffic light having go and no-go periods in the prediction horizon; and
   selecting, by the first vehicle controller, a speed control strategy for the first vehicle relative to the identified traffic light in the prediction horizon to limit degradation of a travel metric of the at least one following vehicle without violating a constraint of the first vehicle; and
   implementing the selected speed control strategy in the first vehicle controller and the second vehicle to pass the identified traffic light using the same first go-period of the at least one upcoming traffic light in the planned travel path shared by the first vehicle and the at least one following vehicle.

5. The vehicle control method of claim 4 wherein the method further comprises communicating the speed control strategy from the first vehicle to the at least one following vehicle.

6. The vehicle control method of claim 5 wherein the step of selecting a speed control strategy for the first vehicle is performed as follows:
   the first vehicle controller calculating a first velocity profile for the first vehicle to pass the identified traffic light in the prediction horizon, the first velocity profile being calculated to minimize energy consumption of the first vehicle;

the first vehicle controller determining that the first velocity profile for the first vehicle would not allow the at least one following vehicle to pass the identified traffic light in the first go period;

the first vehicle controller calculating a second velocity profile which allows the at least one following vehicle to pass the identified traffic light in the first go period; and the first vehicle controller applying control parameters associated with the second velocity profile as the selected speed control strategy.

7. The vehicle control method of claim 5 wherein the step of selecting a speed control strategy for the first vehicle is performed as follows:

the first vehicle controller calculating a first velocity profile for the first vehicle to pass the identified traffic light in the prediction horizon, the first velocity profile being calculated to minimize wear on one or more of brakes and tires of the first vehicle;

the first vehicle controller determining that the first velocity profile for the first vehicle would not allow the at least one following vehicle to pass the identified light in the first go period;

the first vehicle controller calculating a second velocity profile which allows the at least one following vehicle to pass the identified traffic light in the first go period; and the first vehicle controller applying control parameters associated with the second velocity profile as the selected speed control strategy.

8. The vehicle control method of claim 4, further comprising:

the first vehicle communicating a first velocity plan for the first vehicle to a first following vehicle;

the first vehicle receiving, responsive to the communicated first velocity plan, a requested modification to the first velocity plan from the first following vehicle;

the first vehicle controller determining the requested modification can be accommodated without degrading an optimized metric of the first vehicle that would result from use of the first velocity plan beyond a predetermined degradation threshold;

the first vehicle communicating acceptance of the requested modification to the first following vehicle; and the first vehicle controller calculating and implementing a second velocity plan that accommodates the requested modification.

9. The vehicle control method of claim 4, further comprising:

the first vehicle communicating a first velocity plan for the first vehicle to a first following vehicle;

the first vehicle receiving, responsive to the communicated first velocity plan, a requested modification to the first velocity plan from the first following vehicle;

the first vehicle controller determining the requested modification would violate the constraint of the first vehicle;

the first vehicle communicating rejection of the requested modification to the first following vehicle; and the first vehicle controller implementing the first velocity plan.

10. A vehicle controller for a first vehicle, the first vehicle including a communication transceiver for communicating with at least one other vehicle, the vehicle controller configured to:

receive velocity profile data from a second vehicle which is ahead of the first vehicle in a shared planned path of the first vehicle and the second vehicle;

determine whether the received velocity profile data will negatively affect a travel metric of the first vehicle relative to at least one traffic light in the shared planned path;

communicate a request to the second vehicle to adjust the received velocity profile data to accommodate the first vehicle passing the at least one traffic light;

receive a response either accepting or rejecting the request to the second vehicle;

calculate and implement a first velocity profile for the first vehicle if the request is accepted to thereby control velocity of the first vehicle through the at least one traffic light, wherein the first velocity profile is configured to allow the first vehicle and the second vehicle to pass the at least one traffic light in the first go period; and calculate and implement a second velocity profile for the first vehicle if the request is rejected to thereby control velocity of the first vehicle through the at least one traffic light.

11. The vehicle controller of claim 10 wherein the second velocity profile is configured to allow the first vehicle to pass the at least one traffic light in a second go period after the first go period.

12. The vehicle controller of claim 10 wherein the first and second velocity profiles are calculated to minimize energy consumption by the first vehicle.

13. The vehicle controller of claim 10 wherein the first and second velocity profiles are calculated to achieve an earliest time of arrival at a destination for the first vehicle.

14. The vehicle controller of claim 10 wherein the first and second velocity profiles are calculated to minimize wear of one or more subsystems or components of the first vehicle.

* * * * *